(12) United States Patent
Ishikawa et al.

(10) Patent No.: US 8,259,991 B2
(45) Date of Patent: Sep. 4, 2012

(54) IMAGE PROCESSING APPARATUS AND IMAGE PROCESSING METHOD

(75) Inventors: Masaaki Ishikawa, Tokyo (JP); Takashi Saitoh, Tokyo (JP); Hiroshi Shimura, Kanagawa (JP); Haike Guan, Kanagawa (JP); Taeko Ishizu, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 1478 days.

(21) Appl. No.: 11/812,343

(22) Filed: Jun. 18, 2007

(65) Prior Publication Data
US 2007/0297644 A1 Dec. 27, 2007

(30) Foreign Application Priority Data

Jun. 27, 2006 (JP) .................................. 2006-177172
Jun. 7, 2007 (JP) .................................. 2007-152024

(51) Int. Cl.
*G06K 9/00* (2006.01)
*H04N 1/40* (2006.01)
(52) U.S. Cl. ........................................ 382/100; 358/448
(58) Field of Classification Search .................. 382/100, 382/162, 232, 307; 348/211.14, 222.1, 571; 358/1.14, 3.28, 448, 462; 399/366; 701/28
See application file for complete search history.

(56) References Cited

U.S. PATENT DOCUMENTS

| 6,901,236 | B2 * | 5/2005 | Saitoh et al. | 399/366 |
| 8,170,379 | B2 * | 5/2012 | Shiiyama et al. | 382/305 |
| 2005/0151990 | A1 | 7/2005 | Ishikawa et al. | |
| 2006/0126098 | A1 | 6/2006 | Shimura et al. | |
| 2006/0256362 | A1 | 11/2006 | Guan et al. | |
| 2006/0279792 | A1 | 12/2006 | Ishizu et al. | |

FOREIGN PATENT DOCUMENTS

| CN | 1372677 A | 10/2002 |
| EP | 1 509 034 A1 | 2/2005 |
| EP | 1 619 873 A1 | 1/2006 |
| JP | 06-125459 | 5/1994 |
| JP | 07-036317 | 2/1995 |
| JP | 07-087309 | 3/1995 |
| JP | 09-164739 | 6/1997 |
| JP | 2004-274092 | 9/2004 |
| JP | 2005-253004 | 9/2005 |

OTHER PUBLICATIONS

Extended European Search Report, Jun. 17, 2009.

* cited by examiner

*Primary Examiner* — Abolfazl Tabatabai
(74) *Attorney, Agent, or Firm* — Dickstein Shapiro LLP

(57) ABSTRACT

An image processing apparatus embedding information in an image by combining multiple predetermined patterns with the image is disclosed that includes a level determination part configured to determine at least one of the levels of conditions to be added regarding the disposition of the predetermined patterns, to which at least one of the levels the information to be embedded belongs; and a pattern combining part configured to combine the predetermined patterns with the image in accordance with the condition corresponding to the information to be embedded at the determined at least one of the levels. If the information to be embedded belongs to two or more of the levels, the pattern combining part combines the predetermined patterns so that the conditions corresponding to the information to be embedded are satisfied at the two or more of the levels.

17 Claims, 19 Drawing Sheets

FIG.12

| CONFIDENTIALITY LEVEL | RELATIVE ROTATIONAL ANGLE DIFFERENCE : 22.5 x n(n:1~8) |
|---|---|
| 1 | 22.5 x1 |
| 2 | 22.5 x2 |
| 3 | 22.5 x3 |
| 4 | 22.5 x4 |
| 5 | 22.5 x5 |
| 6 | 22.5 x6 |
| 7 | 22.5 x7 |
| 8 | 22.5 x8 |

FIG.13

| USERNAME | SEQUENCE (M=4) |
|---|---|
| A | 0011 |
| B | 0101 |
| C | 0110 |
| D | 1001 |
| E | 1010 |
| F | 1100 |

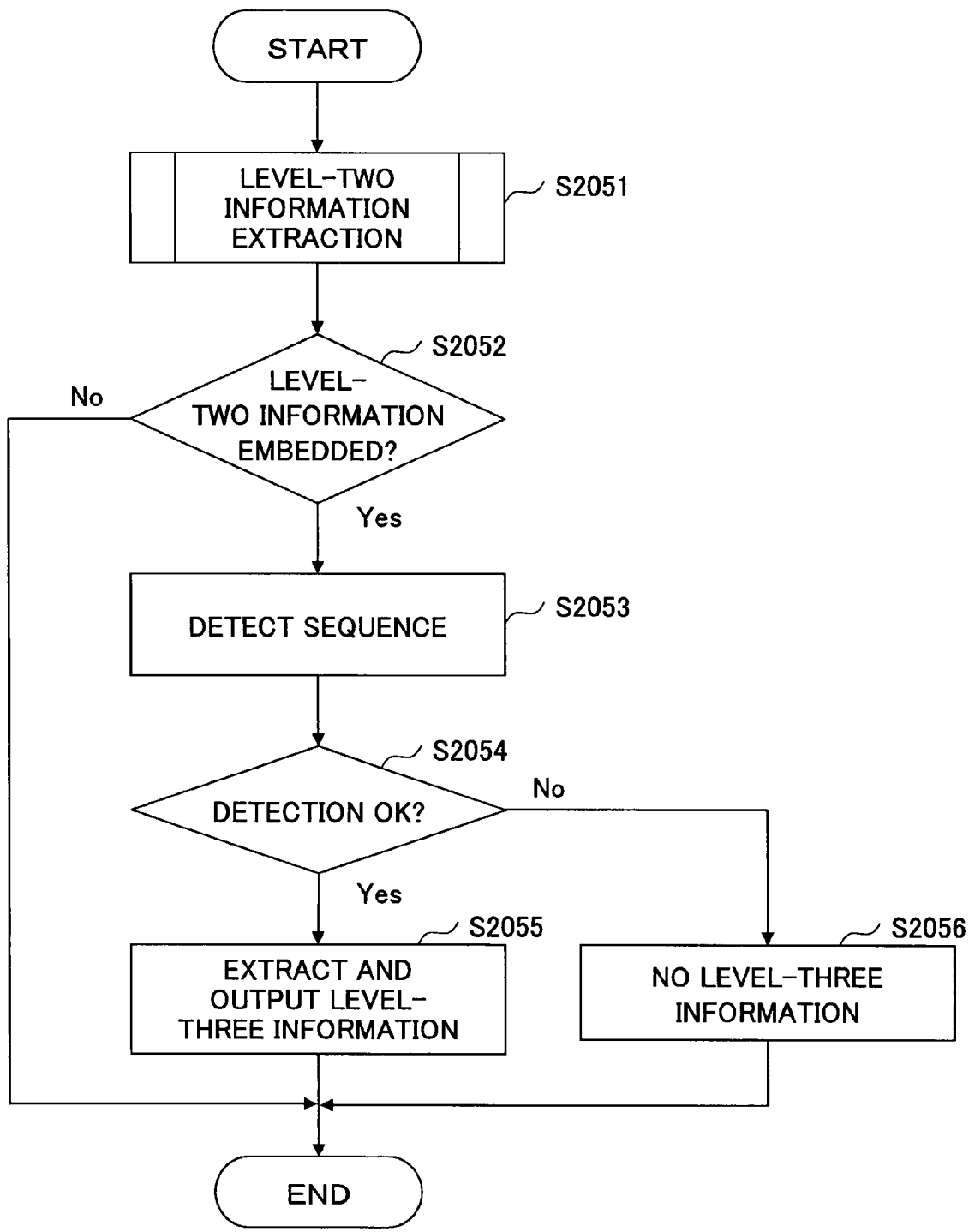

IMAGE PROCESSING APPARATUS AND IMAGE PROCESSING METHOD

BACKGROUND OF THE INVENTION

1. Field of the Invention

The present invention relates generally to image processing apparatuses and image processing methods, and more particularly to an image processing apparatus and an image processing method that embed information in or extract information from an image.

2. Description of the Related Art

Recent improvement of image processing techniques and image forming techniques has made it possible to make such faithful copies of bills or securities (valuable papers), using a digital color copier, that the copies are not easily distinguishable from their original genuine articles. Therefore, it is necessary to take measures so that special materials such as bills and securities cannot be copied at all or correctly.

Further, for example, in company offices, general materials (documents) other than special materials such as bills and securities also include many confidential documents of which outputting such as copying is prohibited in terms of confidentiality of their contents. It is also necessary to take measures so that such confidential documents cannot be copied at all or correctly.

Therefore, conventionally, various inventions have been made to restrain special materials or confidential documents from being copied. For example, Japanese Laid-Open Patent Application No. 2004-274092 proposes the technique of preventing an image from being output if a predetermined dot pattern is detected from the image when the image is read with a scanner. Accordingly, it is possible to effectively prevent reproduction of a confidential document of which copying is prohibited by embedding the predetermined dot pattern in the confidential document in advance.

However, according to the technique disclosed in Japanese Laid-Open Patent Application No. 2004-274092, although it is possible to effectively prevent copying of a confidential document, it is only whether the document is confidential, that is, only one bit's worth of information that can be embedded in the document. In this case, if it were possible to embed more information, it would be possible to perform more flexible security control. For example, it is possible to provide such an application that determines whether to authorize or prohibit copying in accordance with the title (position) of a user in combination with user authentication.

However, now that confidential documents with printed background dot patterns in which copy control information to simply determine whether to authorize or prohibit copying with one bit's worth of information is embedded are common and copiers that perform copy prohibition control by detecting the copy control information are widely used, it is desirable that another several bits' worth of information be embeddable and compatible with the existing background dot patterns. That is, at least one-bit information should be detectable both in the case of reading a confidential original in which several-bit information is further embedded in addition to the one-bit information, using a conventional detector that can detect only one-bit information, and in the case of reading a conventional confidential document in which only the one-bit information is embedded, using a detector that can detect several bits.

SUMMARY OF THE INVENTION

According to one aspect of the present invention, there is provided an image processing apparatus and an image processing method capable of appropriately increasing the amount of information embeddable in an image or the amount of information extractable from an image.

According to one aspect of the present invention, there is provided an image processing apparatus embedding information in an image by combining a plurality of predetermined patterns with the image, the image processing apparatus including a level determination part configured to determine at least one of levels of conditions to be added regarding a disposition of the predetermined patterns, to which at least one of the levels the information to be embedded belongs; and a pattern combining part configured to combine the predetermined patterns with the image in accordance with the condition corresponding to the information to be embedded at the determined at least one of the levels, wherein if the information to be embedded belongs to two or more of the levels, the pattern combining part combines the predetermined patterns so that the conditions corresponding to the information to be embedded are satisfied at the two or more of the levels.

According to one aspect of the present invention, there is provided an image processing apparatus extracting information embedded in an image, the image processing apparatus including a pattern detection part configured to detect a predetermined pattern from the image; and an information extraction part configured to, at each of levels of conditions added regarding a disposition of the predetermined pattern, extract the information embedded at the level by applying information on the disposition of the detected pattern to the condition at the level.

According to one aspect of the present invention, there is provided an image processing method embedding information in an image by combining a plurality of predetermined patterns with the image, the image processing method including the steps of determining at least one of levels of conditions to be added regarding a disposition of the predetermined patterns, to which at least one of the levels the information to be embedded belongs; and combining the predetermined patterns with the image in accordance with the condition corresponding to the information to be embedded at the determined at least one of the levels, wherein if the information to be embedded belongs to two or more of the levels, the step of combining combines the predetermined patterns so that the conditions corresponding to the information to be embedded are satisfied at the two or more of the levels.

According to one aspect of the present invention, there is provided an image processing method extracting information embedded in an image, the image processing method including the steps of detecting a predetermined pattern from the image; and extracting, at each of levels of conditions added regarding a disposition of the predetermined pattern, the information embedded at the level by applying information on the disposition of the detected pattern to the condition at the level.

According to the above-described image processing apparatuses and image processing methods, it is possible to appropriately increase the amount of information embeddable in an image or the amount of information extractable from an image.

Further, according to one aspect of the present invention, there is also provided a computer data signal embodied in a carrier wave readable by a computing system and encoding a computer program of instructions for executing a computer process performing any of the above-described image processing methods.

Further, according to one aspect of the present invention, there is also provided a computer program product including a computer usable medium having computer readable program code embodied in the medium for causing a computer to execute any of the above-described image processing methods.

Thus, according to embodiments of the present invention, it is possible to provide an image processing apparatus, an image processing method, a computer data signal, and a computer program product capable of appropriately increasing the amount of information embeddable in an image or the amount of information extractable from an image.

BRIEF DESCRIPTION OF THE DRAWINGS

Other objects, features and advantages of the present invention will become more apparent from the following detailed description when read in conjunction with the accompanying drawings, in which:

FIG. 12 is a table showing the correspondence between the confidentiality level and the relative angle according to the embodiment of the present invention;

FIG. 13 is a table showing the correspondence between the username and the sequence of basic and additional patterns according to the embodiment of the present invention;

FIG. 22 is a flowchart for illustrating level-three information extraction according to the embodiment of the present invention.

DETAILED DESCRIPTION OF THE PREFERRED EMBODIMENTS

A description is given, with reference to the accompanying drawings, of an embodiment of the present invention. In this embodiment, a description is given of an apparatus, a method, and a program that embed information represented by patterns formed of multiple dots (hereinafter referred to as "dot patterns") in an image by combining the dot patterns with (superposing the dot patterns on) the image. Further, a description is given of an apparatus, a method, and a program that detect the dot patterns from the image with which the dot patterns are combined, and extract the information represented by the detected dot patterns.

Figure 1:
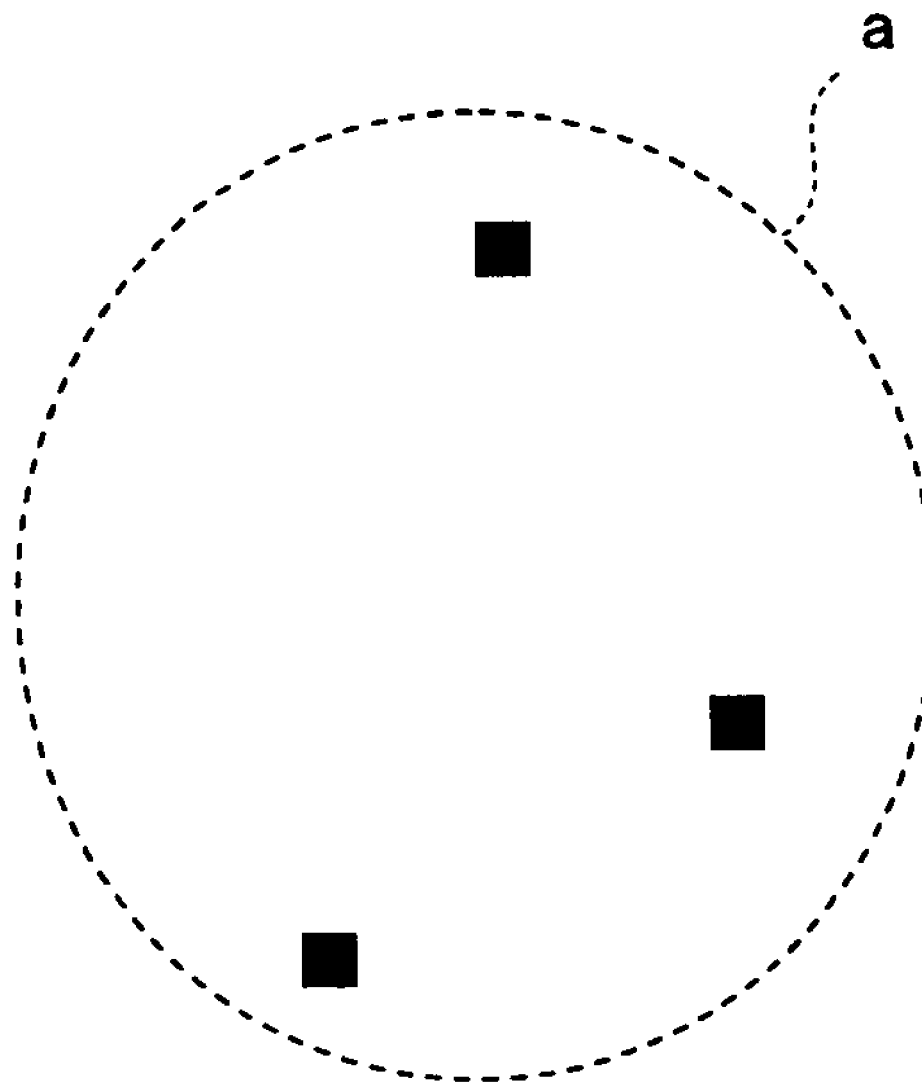
FIG. 1 is a diagram showing an example dot pattern used in an embodiment according to the present invention.

For example, the following are used as dot patterns. FIG. 1 is a diagram showing an example dot pattern used in this embodiment. Referring to FIG. 1, a dot pattern a is formed of three dots whose relative positional relationship is provided. In implementing the present invention, the number of dots forming a single dot pattern may be three or more. Further, the pattern does not necessarily have to be formed of dots. For example, the pattern may be formed of line segments or a combination of a line segment and a dot.

Figure 2:
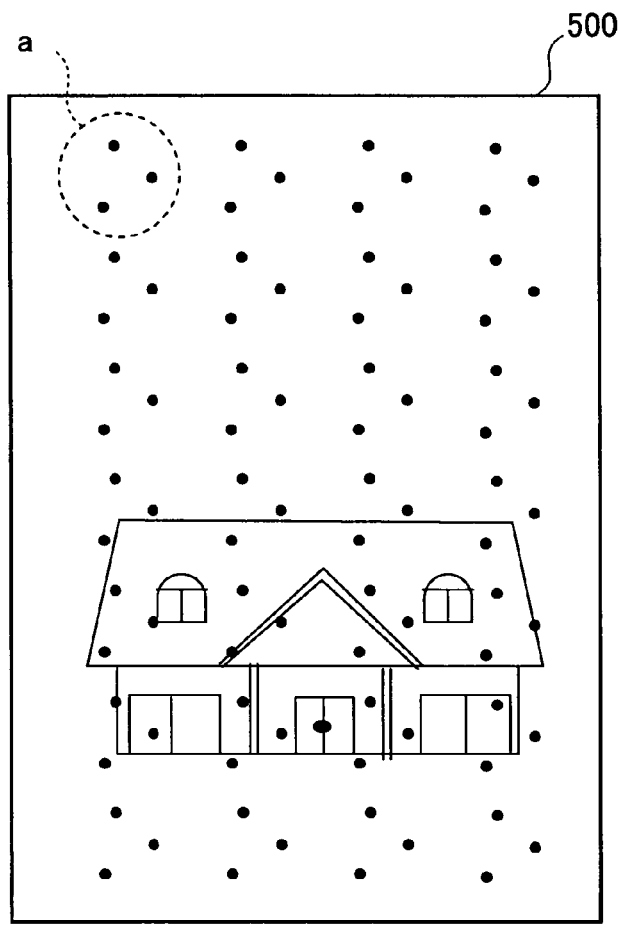
FIG. 2 is a diagram showing an image with which the dot patterns are combined according to the embodiment of the present invention.

FIG. 2 is a diagram showing an image with which dot patterns are combined. FIG. 2 shows the case where the dot pattern a is repeatedly combined with an image 500. In this embodiment, a description is given of the technique of embedding information in an image by thus repeatedly combining a dot pattern with the image.

By combining the dot patterns a with an image, at least one-bit information can be embedded in the image. In this embodiment, a method that embeds information by combining or not combining the dot patterns a is referred to as "level-one method," and the information embedded by the method is referred to as "level-one information." Accordingly, the condition regarding the disposition of dot patterns in embedding the level-one information is that there are a predetermined number ($\geqq 2$) of dot patterns a and/or dot patterns equivalent to the dot patterns a rotated by any angles. That is, at the level one, the angles and positions of the dot patterns a on the image do not matter. It is only necessary that the dot patterns a be combined with the image at some angles in some positions on the image. That the angles and positions of the dot patterns a do not matter has the same meaning as that if dot patterns are combinable with an image only in a limited area thereof in order to increase the speed of extraction or because of hardware restrictions at the time of combining the dot patterns with the image, the angles and positions of the dot patterns do not matter in a predetermined area on the image in which the dot patterns are combinable with the image. The same applies to the following description of the disposition.

Here, it is for preventing wrong determination that detection of a predetermined number or more of dot patterns is determined as a condition. For example, it is assumed that the presence of at least one dot pattern is determined as a condition. In this case, if part of an image that contains dots as a drawing element happens to coincide with the dot pattern a, it is wrongly determined that the dot pattern a is combined with the image. Accordingly, in principle, the combination of at least one dot pattern may be determined as a condition. However, in view of practical application, it is desirable to determine the presence of at least a predetermined number of dot patterns in an image as the level-one condition on the assumption that the multiple dot patterns a are combined with the image as shown in FIG. 2.

Figure 3:
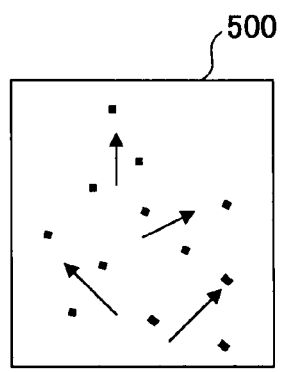
FIG. 3 is a diagram showing an example combination of the dot patterns with the image by a level-one method according to the embodiment of the present invention.

FIG. 3 is a diagram showing an image with which dot patterns are combined by the level-one method. In FIG. 3, the drawing element (a picture of a house) of the image 500 is omitted for convenience of description. Further, the arrows in FIG. 3 are provided for indicating the orientations (angles) of the respective dot patterns a, and are not a drawing element on the image 500. FIG. 3 shows the case where the dot patterns a and/or dot patterns equivalent to the dot patterns a rotated by any angles as described above are combined with the image 500 at any positions thereon. In FIG. 3, four dot patterns are combined with the image 500 for convenience of description. In practice, however, it is preferable to combine more dot patterns in terms of detection accuracy.

If a further condition (restriction) is added regarding the disposition of the dot patterns a, it is possible to hierarchically embed information in the image 500. In this embodiment, a description is given of the case of providing the relative angle of the combined dot patterns a with a meaning (information). For example, a predetermined number or more of dot patterns a or dot patterns equivalent to the dot patterns a rotated by any angle (hereinafter referred to as "basic patterns") are combined with an image, and a predetermined number or more of dot patterns equivalent to the basic patterns rotated by a predetermined angle (hereinafter referred to as "additional patterns") are combined with the image. Thereby, it is possible to embed information in the relative angle between the basic and additional dot patterns. Here, the number of basic patterns and the number of additional patterns are preferably the same or substantially the same in terms of detection accuracy. In this embodiment, such a method of embedding information is referred to as "level-two method," and the information embedded by the method is referred to as "level-two information." Accordingly, the condition regarding the disposition of dot patterns in embedding the level-two information is that there are a predetermined number or more of basic patterns and a predetermined number or more of additional patterns.

According to the level two, it is possible to embed approximately several bits' worth of information by changing the relative angle between the basic and additional patterns. The maximum value of the relative angle between the basic and additional patterns is 180°. Accordingly, it is possible to embed 3-bit information by quantizing the relative angle into eight values (levels) at intervals of 22.5°. In this embodiment, the condition of a relative angle of 0° is not used to embed information in view of the holdability of a below-described level three (so that the level three holds). Accordingly, in the case of performing quantization in units of 22.5°, the relative angle can take values of $22.5°\times n (1\leq n\leq 8)$.

Figure 4:
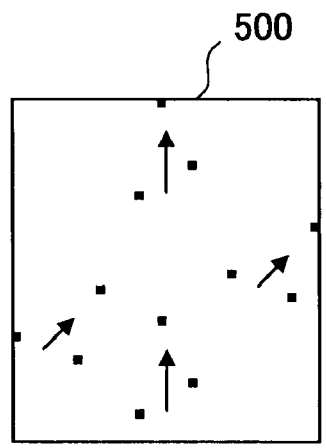
FIG. 4 is a diagram showing an example combination of the dot patterns with the image by a level-two method according to the embodiment of the present invention.

FIG. 4 is a diagram showing an example image with which dot patterns are combined by the level-two method. In FIG. 4, the drawing element (a picture of a house) of the image 500 is omitted for convenience of description. Further, the arrows in FIG. 4 are provided for indicating the orientations (angles) of the respective dot patterns a, and are not a drawing element on the image 500. FIG. 4 shows the case where the two dot patterns a and two dot patterns equivalent to the dot patterns a rotated by 45° are combined with the image 500. Since the relative angle matters at the level two, it does not matter which are basic patterns and which are additional patterns. That is, the patterns are called "basic patterns" or "additional patterns" merely for the sake of convenience. It is for improving detection accuracy that detection of a predetermined number or more of basic patterns and a predetermined number or more of additional patterns is determined as a condition at the level two. Accordingly, although only two each of the basic patterns and the additional patterns are combined with the image 500 in FIG. 4, it is desirable to combine more dot patterns in view of practical application.

As a result of the presence of the dot patterns a or dot patterns equivalent to the dot patterns a rotated by any angle, the level-one information can be detected from the image 500 shown in FIG. 4. Further, the level-two information can be detected based on the relative angle between the basic and additional patterns. Thus, the information is embedded in two layers (levels) in the image 500 of FIG. 4.

Further, the dot patterns from which the level-two information is detectable are formed using the dot patterns a in FIG. 4. Alternatively, the level-two information can also be embedded using dot patterns different from the dot patterns a (hereinafter referred to as "dot patterns b"). In the case of using the dot patterns b, the information that no dot patterns a are combined can be extracted as the level-one information, and the information signified by a relative angle based on the dot patterns b serving as basic patterns can be extracted as the level-two information.

It is possible to increase the number of layers of information embeddable in the image 500 by adding another condition (restriction) regarding the disposition of the dot patterns a while maintaining the feature of the level two. In this embodiment, a description is given of the case where the relative positions of the basic and additional patterns are provided with a meaning (information). That is, it is possible to embed information in the order of arrangement (sequence) of the basic patterns and the additional patterns to be combined with the image. In this embodiment, such a method of embedding information is referred to as "level-three method," and the information embedded by the method is referred to as "level-three information." Accordingly, the condition regarding the disposition of dot patterns in embedding the level-three information is that there are a predetermined number or more of basic patterns and a predetermined number or more of additional patterns and the basic patterns and the additional patterns form a predetermined sequence. In order to make it possible to maintain the level-two condition, at least one basic pattern and at least one additional pattern should be contained in the sequence. Further, the number of basic patterns and the number of additional patterns contained in the sequence are preferably the same or substantially the same in terms of detection accuracy.

According to the level three, it is possible to embed information of tens of bits or more by changing the combination of both patterns in the sequence. For example, it is assumed that the same numbers of basic patterns and additional patterns are combined in a sequence. In this case, the number of combinations of the sequence is $M!/((M/2)!\times(M/2)!)$, letting the sequence length (the length of a sequence or the number of predetermined patterns combinable in a single sequence) be M. Accordingly, it is possible to embed information of $\log_2(M!/((M/2)!\times(M/2)!))$ bits.

Figure 5:
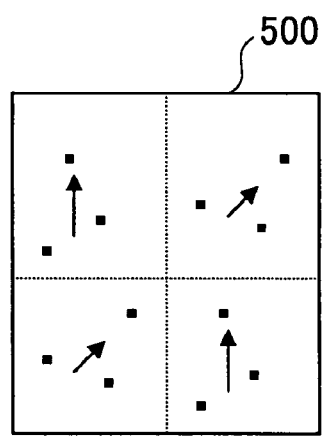
FIG. 5 is a diagram showing an example combination of the dot patterns with the image by a level-three method according to the embodiment of the present invention.

FIG. 5 is a diagram showing an example image with which dot patterns are combined by the level-three method. In FIG. 5, the drawing element (a picture of a house) of the image 500 is omitted for convenience of description. Further, the arrows and dotted lines in FIG. 5 are provided for indicating the orientations (angles) of the respective dot patterns a or the boundaries of areas, and are not a drawing element on the image 500. Referring to FIG. 5, the image 500 is separated into four areas as indicated by the dotted lines. FIG. 5 shows the case where the basic and additional patterns are arranged in order of upper left, upper right, lower left, and lower right. In the case of FIG. 5, since the sequence length (M) is four, there are $4!/(2!\times 2!)=6$ combinations. Here, letting the basic and additional patterns be "1" and "0," respectively, four-bit information of "0110" is embedded in the image 500 of FIG. 5 at the level three. That is, since the basic and additional patterns are assigned respective different values at the level three, it is necessary to identify the basic patterns and the additional patterns, respectively. As a result, an operation or processing with higher accuracy is required to extract information.

In FIG. 5, the amount of representable information is reduced compared with the above-described described case of the level two because FIG. 5 shows the case where the sequence length is four for convenience of description. In practice, however, the sequence length can be further increased. For example, the amount of information representable on an A4-size sheet of paper may be tens of bits to approximately 100 bits.

In terms of better detection accuracy, information may be embedded by repeatedly providing the same sequence several times on an image or by converting part of a sequence into an error-correcting correcting code. As a result, it is possible to extract information with high accuracy even when a dot pattern is on a drawing element (character, letter, or picture) or dirt on the image so as to prevent accurate reading.

As a result of the presence of the dot patterns a or dot patterns equivalent to the dot patterns a rotated by any angle, the level-one information can be detected from the image 500 shown in FIG. 5. Further, the level-two information can be detected based on the relative angle between the basic and additional patterns. Furthermore, the level-three information can be detected based on the sequence of the basic and additional patterns. Thus, the information is embedded in three layers (levels) in the image 500 of FIG. 5. This is shown conceptually in FIG. 6.

In FIG. 5, the dot patterns from which the level-three information is detectable are formed using the dot patterns a. Alternatively, the level-three information can also be embedded using the dot patterns b or dot patterns different from the dot patterns a and b (hereinafter referred to as "dot patterns c"). In the case of using the dot patterns b, the information that no dot patterns a are combined can be extracted as the level-one information, the information signified by a relative angle based on the dot patterns b serving as basic patterns can be extracted as the level-two information, and the information signified by the sequence of the dot patterns b can be extracted as the level-three information. In the case of using the dot patterns c, the information that patterns according to the corresponding levels are not combined can be extracted as the level-one information and the level-two information, and the information signified by the sequence of the dot patterns c can be extracted as the level-three information.

Figure 6:
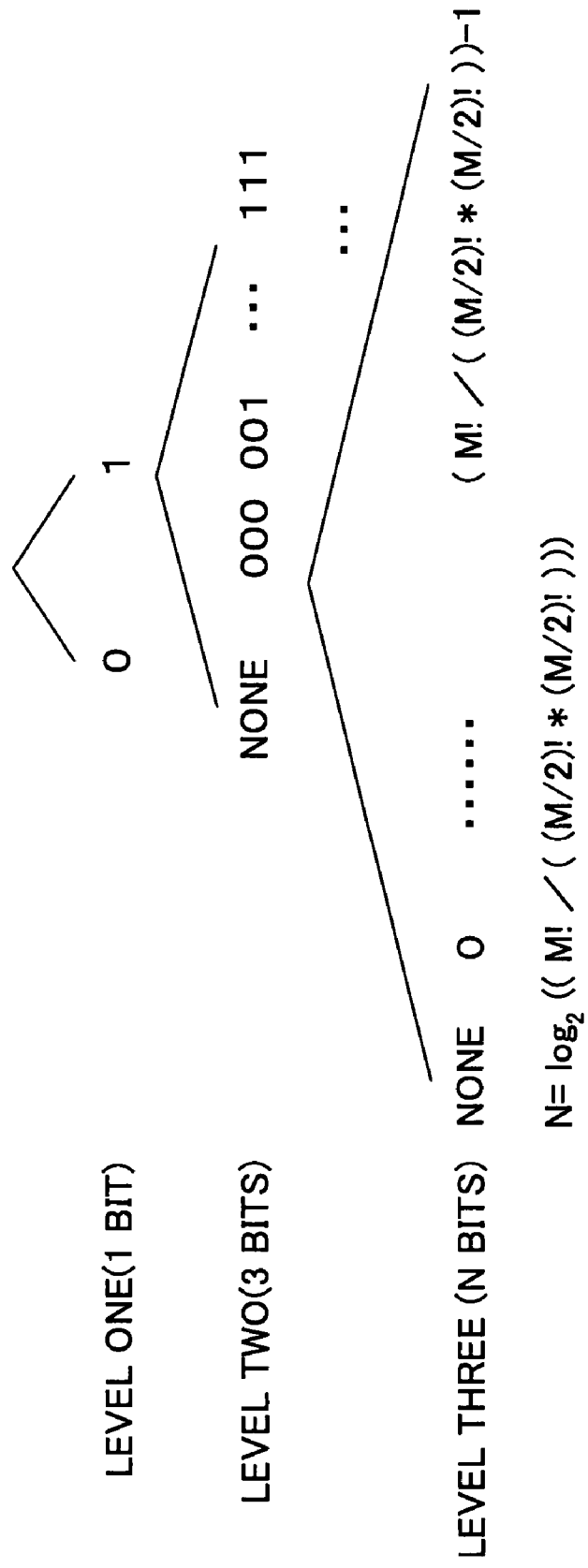
FIG. 6 is a diagram conceptually showing a hierarchical (layer) structure of embedded information according to the embodiment of the present invention.

FIG. 6 is a diagram conceptually showing a hierarchical (layer) structure of embedded information. FIG. 6 shows the case of quantizing the relative angle into eight values (levels) with respect to the level two. In the case of embedding only one-bit information of the level one, it is only necessary that there be the dot patterns a and/or dot patterns equivalent to the dot patterns a rotated by any angles, and there may be any relative angular difference between patterns. If it is desired to further embed several-bit information of the level two, it is necessary not only that there be the dot patterns a or dot patterns equivalent to the dot patterns a rotated by any angle, but also that the relative angular difference between the basic and additional patterns always be a certain angle (a predetermined angular difference such as 45°). However, the patterns may be placed in any manner. Moreover, if it is desired to further embed information of tens of bits or more of the level three, it is necessary not only that there be both basic and additional patterns and the relative angular difference therebetween always be a certain angle, but also that these patterns with a relative angular difference be placed in a predetermined manner. Further, extraction of information is hierarchically performed in ascending order of levels, starting at the level one. The easiness of extraction of information decreases as the level becomes higher.

That is, at the level one, only the presence or absence of the dot patterns a and/or dot patterns equivalent to the dot patterns a rotated by any angles is recognized (determined). Therefore, the image area to be referred to at a time in recognizing patterns may be small (limited), and of numerous patterns on the image, it is only necessary to recognize a predetermined number of patterns. Accordingly, extraction of information is easiest at the level one.

At the level two, it is further necessary to correctly recognize a pattern inclination as well. Accordingly, extraction of information is more difficult than at the level one.

At the level three, it is further necessary to correctly recognize information on the disposition of two types of patterns with a relative angular difference over the entire image. Accordingly, extraction of information is most difficult. Further, since it is necessary to distinguish between the basic and additional patterns, the original material should be placed straight when scanned. However, skew correction may be performed on an image obtained by scanning (a scanned image). The algorithm used for this skew correction is not limited in particular, and a known algorithm may be adopted. Accordingly, a detailed description of skew correction is omitted.

Regarding the level one and the level two, the effect of an inclination of the original material at the time of scanning over the accuracy of information extraction is relatively limited. This is because the angles of the dot patterns a do not matter at the level one and only the relative angle between the basic and additional pattern matters at the level two.

Next, a description is given, with reference to an apparatus, method, and program for embedding or extracting information according to the above-described level one to level three.

Figure 7:
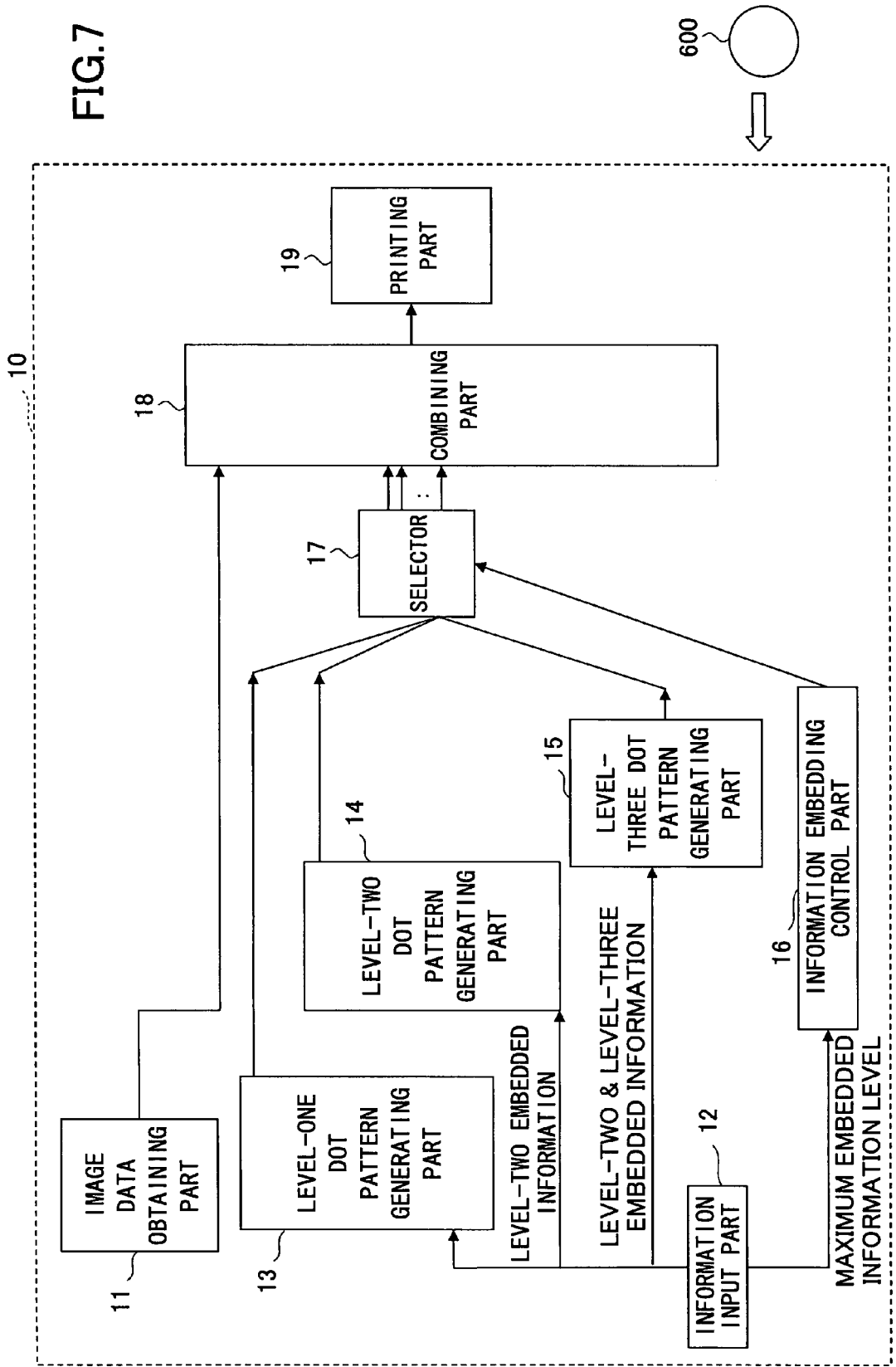
FIG. 7 is a diagram showing a functional configuration of an image processing apparatus having an information embedding function according to the embodiment of the present invention.

First, a description is given of embedding information in an image. FIG. 7 is a diagram showing a functional configuration of an image processing apparatus 10 having an information embedding function. Referring to FIG. 7, the image processing apparatus 10, which embeds information in an image by combining the dot patterns a or dot patterns equivalent to the rotated dot patterns a with the image, includes an image data obtaining part 11, an information input part 12, a level-one dot pattern generating part 13, a level-two dot pattern generating part 14, a level-three dot pattern generating part 15, an information embedding control part 16, a selector processing part (selector) 17, a combining part 18, and a printing part 19. The image processing apparatus 10 may be formed of, for example, a general-purpose computer or personal computer (PC), a printer in which one or more applications are implementable, a multifunction machine such as an MFP, a digital camera, or a ticket vending machine. Each part shown in FIG. 7 is realized by the CPU of the apparatus 10 processing a program installed in the apparatus 10. The program may be prerecorded in the ROM of the apparatus 10 or downloaded via a network. The program may also be installed from a recording medium 600 such as a CD-ROM.

The image data obtaining part 11 obtains or generates data containing an image in which information is to be embedded (hereinafter referred to as "target image"). For example, the image data obtaining part 11 may include word processor software for generating text data and a program for converting the text data generated by the word processor software into image data. Alternatively, the image data obtaining part 11 may read prestored image data. The information input part 12 receives input of information to be embedded in the target image (hereinafter referred to as "embedded information"). The level-one dot pattern generating part 13 generates the image data of dot patterns (dot pattern data) according to level-one embedded information. The level-two dot pattern generating part 14 generates the image data of dot patterns (dot pattern data) according to level-two embedded information. The level-three dot pattern generating part 15 generates the image data of dot patterns (dot pattern data) according to the level-two embedded information and level-one embedded information. The information embedding control part 16 selects dot patterns to be combined with the target image by controlling the selector 17 in accordance with the level of embedded information received by the information input part 12. That is, the information embedding control part 16 and the selector 17 select the dot patterns to be combined with the target image from the dot patterns generated by the level-one dot pattern generating part 13, the level-two dot pattern generating part 14, and the level-three dot pattern generating part 15. The combining part 18 combines the selected dot patterns with the target image, thereby generating image data in which the dot patterns are combined with the background of a drawing element. The printing part 19 controls printing of the output image data of the combining part 18 on a paper medium.

A more detailed description is given of the level-one dot pattern generating part 13, the level-two dot pattern generating part 14, and the level-three dot pattern generating part 15.

Figure 8:
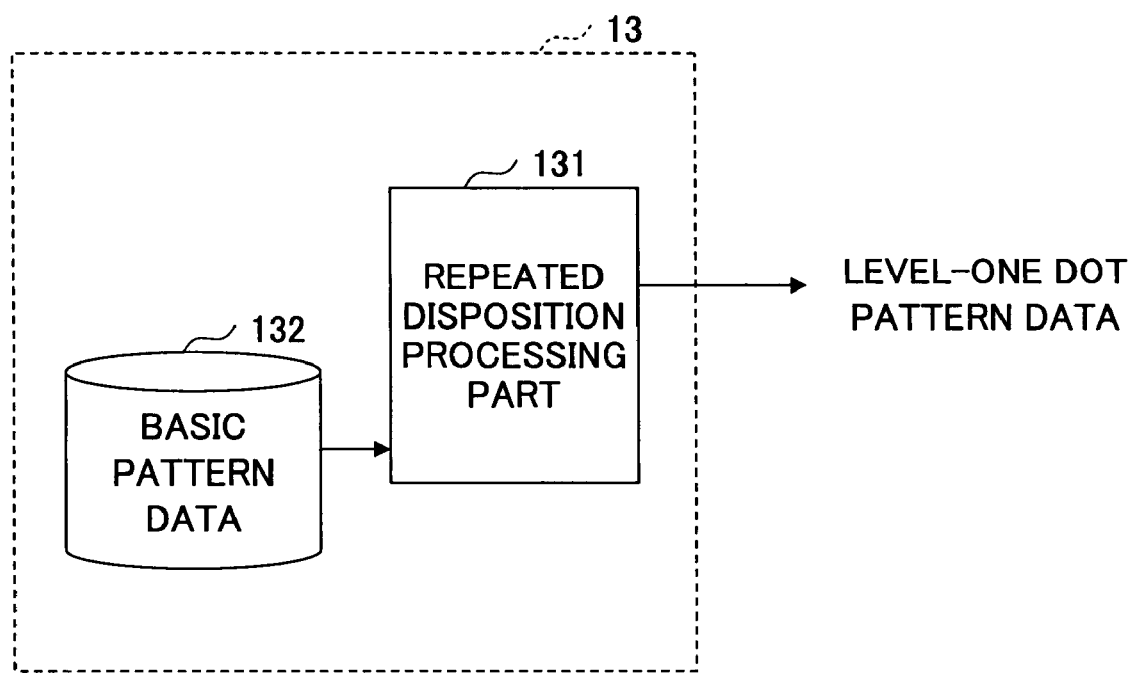
FIG. 8 is a diagram showing a configuration of a level-one dot pattern generating part of the image processing apparatus of FIG. 7 according to the embodiment of the present invention.

FIG. 8 is a diagram showing a configuration of the level-one dot pattern generating part 13. Referring to FIG. 8, the level-one dot pattern generating part 13 includes a repeated disposition processing part 131. The repeated disposition processing part 131 reads image data containing a basic pattern prestored in a storage unit of the image processing apparatus 10 (basic pattern data 132), and generates image data in which the basic pattern is repeatedly provided. The image data generated by the repeated disposition processing part 131 are the output data of the level-one dot pattern generating part 13 (level-one dot pattern data).

Figure 9:
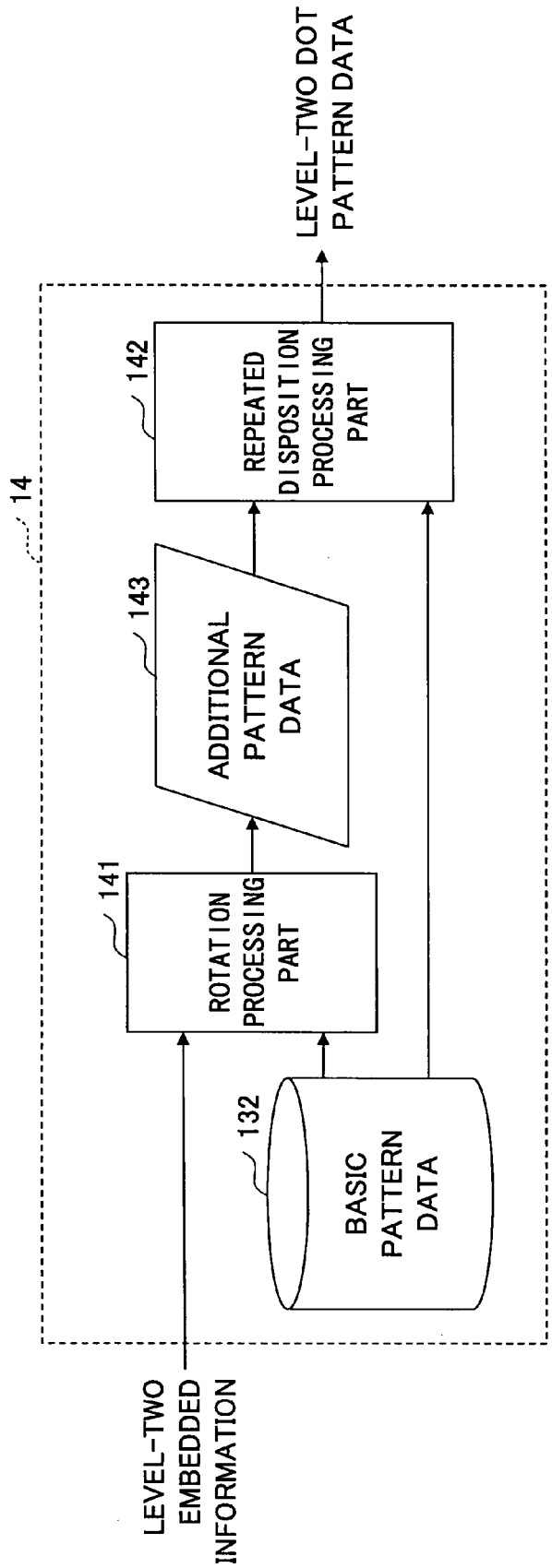
FIG. 9 is a diagram showing a configuration of a level-two dot pattern generating part of the image processing apparatus of FIG. 7 according to the embodiment of the present invention.

FIG. 9 is a diagram showing a configuration of the level-two dot pattern generating part 14. In FIG. 9, the same elements as those of FIG. 8 are referred to by the same numerals, and a description thereof is omitted. Referring to FIG. 9, the level-two dot pattern generating part 14 includes a rotation processing part 141 and a repeated disposition processing part 142. The rotation processing part 141 generates an additional pattern by rotating a basic pattern contained in the basic pattern data 132 by an angle according to the level-two embedded information, and generates image data containing the additional pattern (additional pattern data 143). The repeated disposition processing part 142 generates image data in which the basic pattern contained in the basic pattern data 132 and the additional pattern contained in the additional pattern data are repeatedly provided. The image data generated by the repeated disposition processing part 142 are the output data of the level-two dot pattern generating part 14 (level-two dot pattern data).

Figure 10:
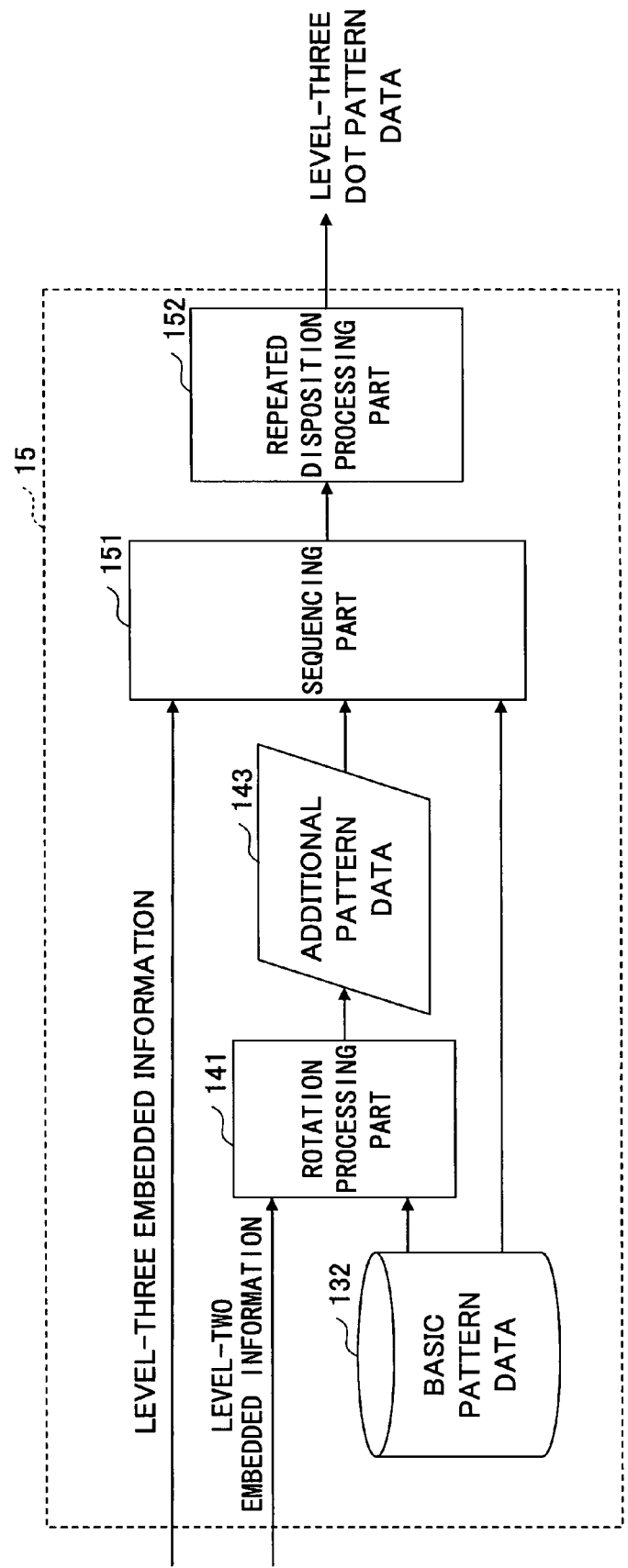
FIG. 10 is a diagram showing a configuration of a level-three dot pattern generating part of the image processing apparatus of FIG. 7 according to the embodiment of the present invention.

FIG. 10 is a diagram showing a configuration of the level-three dot pattern generating part 15. In FIG. 10, the same elements as those of FIG. 9 are referred to by the same numerals, and a description thereof is omitted. Referring to FIG. 10, the level-three dot pattern generating part 15 includes the rotation processing part 141, a sequencing part 151, and a repeated disposition processing part 152. The sequencing part 151 generates a sequence of basic and additional patterns in accordance with the level-three embedded information. The repeated disposition processing part 152 generates image data in which the sequence generated by the sequencing part 151 is repeatedly provided. The image data generated by the repeated disposition processing part 152 are the output data of the level-three dot pattern generating part 15 (level-three dot pattern data).

Figure 11:
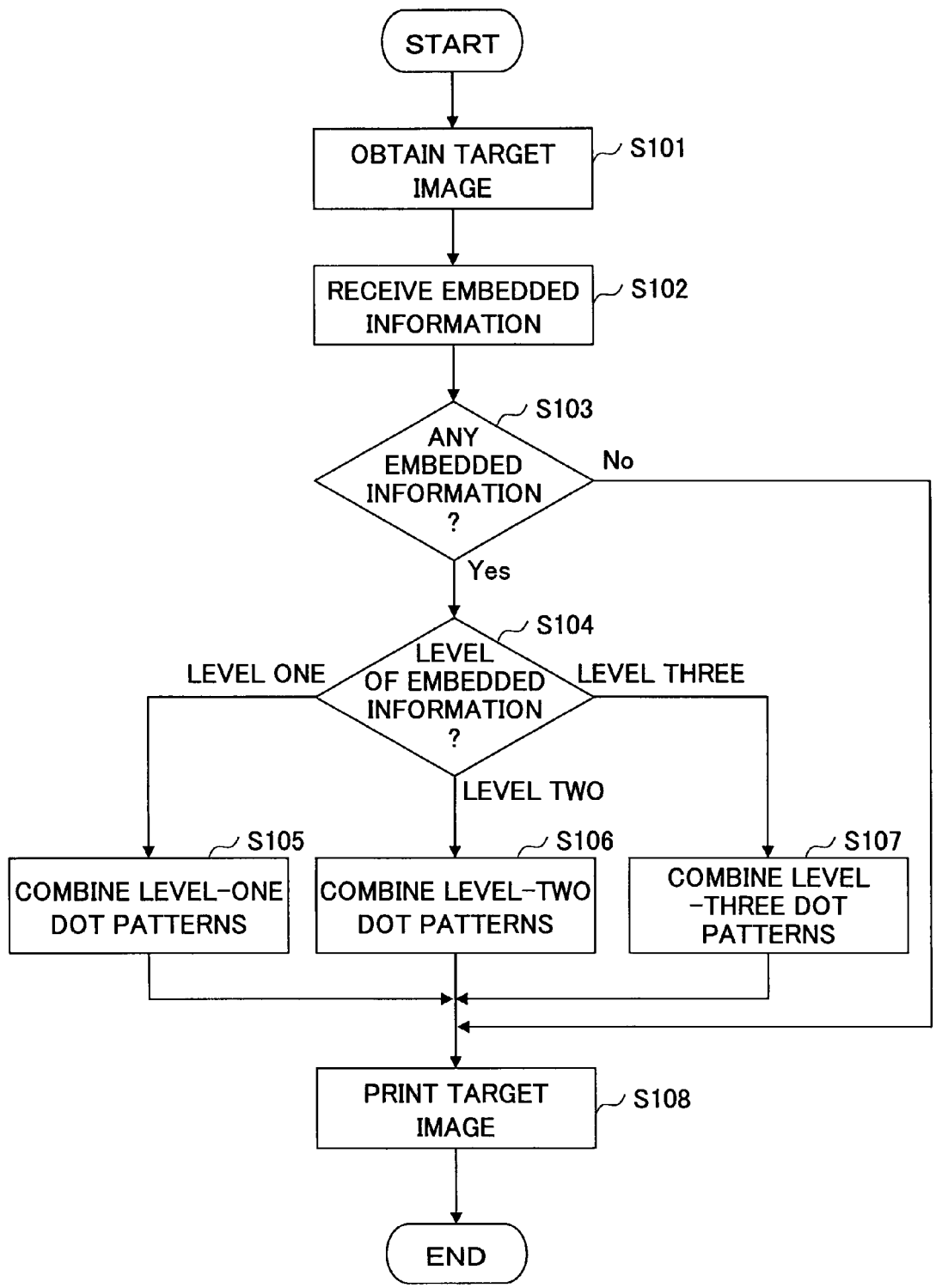
FIG. 11 is a flowchart for illustrating information embedding by the image processing apparatus of FIG. 7 according to the embodiment of the present invention.

A description is given below of an operational procedure of the image processing apparatus 10 of FIG. 7. FIG. 11 is a flowchart for illustrating information embedding by the image processing apparatus 10. In the case of FIG. 11, the level-one information shows the presence or absence of restrictions on copying (copying restriction), the level-two information shows the confidentiality (classification) level of a target image (document), and the level-three information shows the username of a user who embeds information.

In step S101, the image data obtaining part 11 obtains an image in which information is to be embedded (target image), and loads the target image into the memory of the image processing apparatus 10. Next, in step S102, the information input part 12 receives input of the information to be embedded (embedded information). The embedded information may be input on an input screen, which may be displayed on a display unit. At this point, the presence or absence of copy restriction on the target image is caused to be selected. (The level-one information is caused to be determined.) If the presence of copy restriction is selected, it is made possible to determine (set) the confidentiality level of the target image (the level-two information). Further, if the confidentiality level is determined, then it is made possible to input the username of a current user (a user who embeds information) (the level-three information). In step S103, it is determined if any embedded information has been input. If no embedded information has been input (NO in step S103), in step S108, the printing part 19 causes the target image to be directly printed.

On the other hand, if any embedded information has been input (YES in step S103), in step S104, the information embedding control part 16 determines the level of the embedded information. If it is determined in step S104 that only copying restriction has been selected ("level one" in step S104), in step S105, the information embedding control part 16 causes the level-one dot pattern generating part 13 and the combining part 18 to embed the level-one information in the target image. That is, the repeated disposition processing part 131 of the level-one dot pattern generating part 13 generates and outputs image data in which a basic pattern contained in the basic pattern data 132 is repeatedly provided as many times as or more times than a predetermined threshold (level-one dot patterns). Further, the combining part 18 combines the level-one dot patterns with the target image.

If it is determined in step S104 that copying restriction has been selected and that a confidentiality level has also been input ("level two" in step S104), in step S106, the information embedding control part 16 causes the level-two dot pattern generating part 14 and the combining part 18 to embed the confidentiality level in the target image. That is, the rotation processing part 141 of the level-two dot pattern generating part 14 generates an additional pattern by rotating a basic pattern contained in the basic pattern data 132 by an angle corresponding to the confidentiality level, and generates image data containing the additional pattern (additional pattern data 143). The angle corresponding to the confidentiality level (level-two information) may be determined by referring to a table as shown below.

FIG. 12 is a table showing the correspondence between the confidentiality level and the relative angle (relative rotational angle difference). In the correspondence table of FIG. 12, the relative angles quantized in units of 22.5° in accordance with the confidentiality level are recorded. The correspondence table of FIG. 12 may be prestored in the storage unit of the image processing apparatus 10.

Further, the repeated disposition processing part 142 generates image data in which the basic pattern contained in the basic pattern data 132 and the additional pattern contained in the additional pattern data 143 are repeatedly disposed (level-two dot pattern data). At this point, the repeated disposition processing part 142 generates the level-two dot pattern data so that the level-one condition is also satisfied, that is, the total number of basic patterns and/or additional patterns to be combined with the target image is greater than the predetermined threshold at the level one. Further, the combining part 18 combines the level-two dot patterns with the target image.

Further, if it is determined in step S104 that copying restriction has been selected, a confidentiality level has been input, and a username has been input ("level three" in step S104), in step S107, the information embedding control part 16 causes the level-three dot pattern generating part 15 and the combining part 18 to embed the confidentiality level and the username in the target image. That is, the rotation processing part 141 of the level-three dot pattern generating part 15 generates an additional pattern by rotating a basic pattern contained in the basic pattern data 132 by the angle corresponding to the level-two embedded information, and generates image data containing the additional pattern (additional pattern data 143). Further, the sequencing part 151 generates a sequence of the basic and additional patterns in accordance with the input username. At this point, the sequencing part 151 sequences the basic and additional patterns so that the relative angle corresponding to the level-two embedded information is maintained. The sequence of the basic and additional patterns according to the username (level-three information) may be determined by referring to a table as shown below.

FIG. 13 is a table showing the correspondence between the username and the sequence of basic and additional patterns. In the correspondence table of FIG. 13, the combinations of basic and additional patterns of the sequence are recorded in accordance with the username. FIG. 13 shows the case where the same numbers of basic patterns and additional patterns are disposed in the sequence with the sequence length being four, the basic pattern being "0," and the additional pattern being "1."

Further, the repeated disposition processing part 152 generates image data in which the sequence generated by the sequencing part 151 is repeatedly provided (level-three dot pattern data). At this point, the repeated disposition processing part 152 generates the level-three dot pattern data so that the level-one condition is also satisfied, that is, the total number of basic patterns and/or additional patterns to be combined with the target image is greater than the predetermined threshold at the level one. Further, the combining part 18 combines the level-three dot patterns with the target image.

After step S105, S106, or S107, the printing part 19 causes the target image having the dot patterns combined therewith to be printed.

The information to be correlated with each level is not limited to the above-described examples, and may be suitably determined in accordance with applications. A description is given of example applications.

As described above, the level-one information is whether there is one or more predetermined patterns on an image, that is, one-bit information. Accordingly, it is possible to embed information as to whether something is A or not as the level-one information. Further, information such as "whether copying is prohibited," "whether storage (in a storage unit such as an HDD) is possible," "whether an image in which information is embedded is to be charged for," and "whether the level-two or level-three information is embedded (in an image)" may also be embedded. In this case, embedding information corresponding to the level-one information as the level-two information and/or the level-three information further increases convenience.

Further, a description is given of the case of embedding information corresponding to the level-one information as the level-two information and/or the level-three information.

For example, in the case of embedding information as to "whether an image in which information is embedded is to be charged for" as the level-one information, information about control of the image processing apparatus 10, such as information that no processing such as copying is to be performed unless charging is confirmed or information for announcing that the image is to be charged for on a display unit, may be embedded as the level-two information, and the URL of an access destination for charging may be embedded as the level-three information. The level-two information and the level-three information may be interchanged. However, it is desirable that information about apparatus control be embedded as lower-level information or information of a level at which information can be extracted with more certainty.

Figure 14:
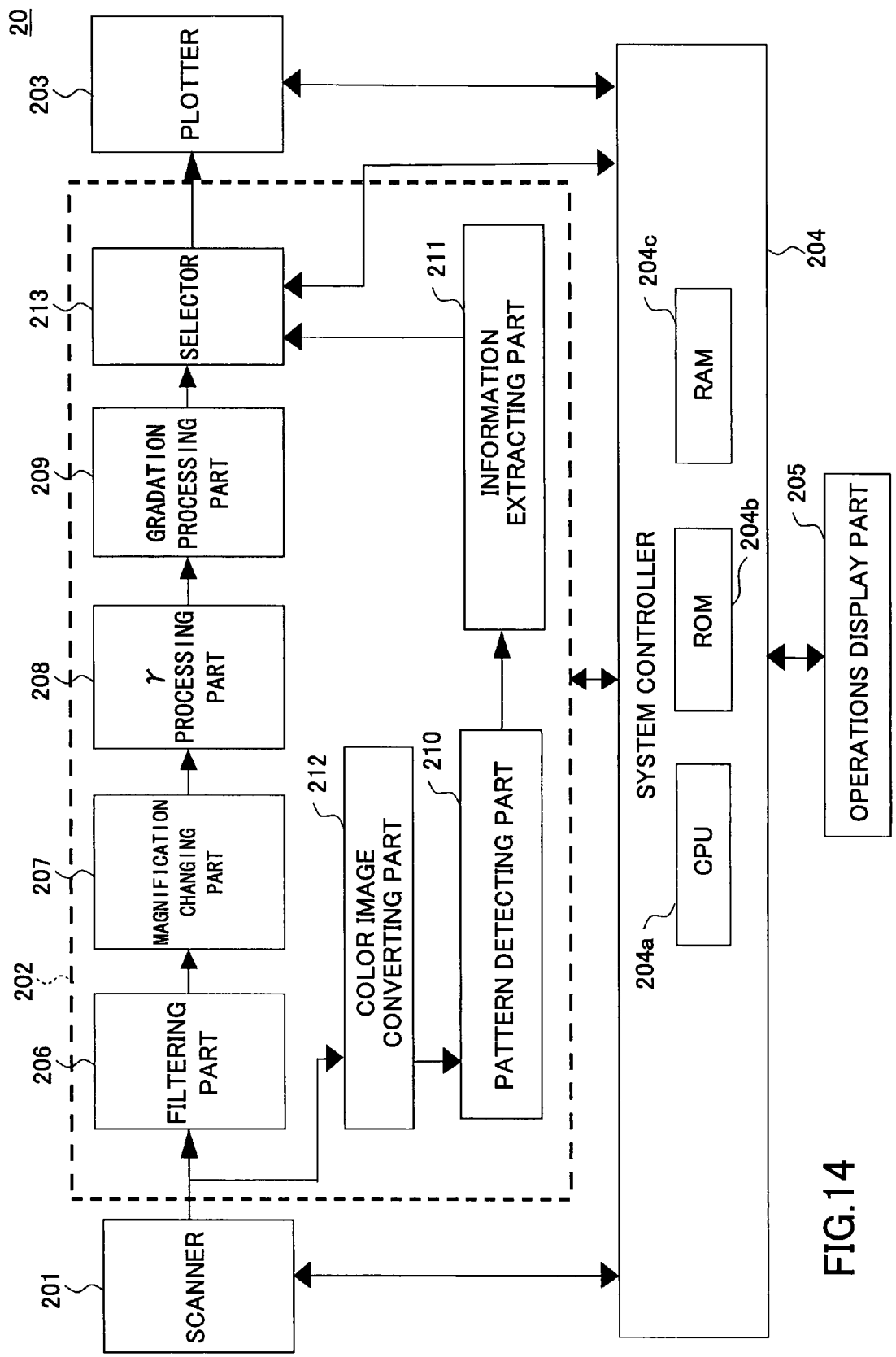
FIG. 14 is a diagram showing a hardware configuration of an image processing apparatus having an information extraction function according to the embodiment of the present invention.

Next, a description is given of extraction of the information embedded in an image as described above. FIG. 14 is a diagram showing a hardware configuration of an image processing apparatus 20 having an information extraction function. The image processing apparatus 20 of FIG. 14 is capable of extracting information embedded in an image by detecting the dot patterns a and/or dot patterns equivalent to the rotated dot patterns a combined with the image. The image processing apparatus 20 includes a scanner 201 as an image reader, an image processor part 202 configured as a digital circuit, a plotter 203, and a system controller 204. The image processing apparatus 20 is configured as a digital copier where the system controller 204 controls the scanner 201, the image processor part 202, and the plotter 203. The image processing apparatus 20 may also be a personal computer, a multifunction machine such as an MFP, a printer, a digital camera, and a ticket vending machine. The system controller 204 includes a built-in CPU (central processing unit) 204a, ROM (read-only memory) 204b, and RAM (random access memory) 204c. Using the computational function structured by the CPU 204a, the ROM 204b, and the RAM 204c, the system controller 204 controls the scanner 201, the image processor part 202, and the plotter 203 in accordance with instructions from an operations display part 205, and returns necessary information to the operations display part 205 so as to cause the necessary information to be displayed thereon.

The image processing part 202 includes a filtering part 206, a magnification changing part 207, a y processing part 208, and a gradation processing part 209. These parts 206 through 209 are not different from their respective equivalent circuit configurations of common digital copiers, and accordingly, a description thereof is omitted.

The image processor part 202 further includes a pattern detecting part 210, an information extracting part 211, a color image converting part 212, and a selector 213. These parts 210 through 213 are hardware pieces configured as digital circuits provided in order to extract information embedded in an image. However, the pattern detecting part 210, the information extracting part 211, and the color image converting part 212 may be realized by software. In this case, these parts 210 through 212 are caused to function by a program recorded in the ROM 204b being loaded into the RAM 204c and processed by the CPU 204a.

An original material image read from original material such as a document by the scanner 201 is subjected to rotation correction as required so as to be output to the color image converting part 212. If information is embedded through the relative angle between basic and additional patterns (that is, the level-two or higher information is embedded), the rotation correction is not necessarily required.

The color image converting part 212 determines the color of a pattern in an image in which information is embedded (target image), and performs image conversion in accordance with the color. For example, if dots of a color component in CMY space (for example, the M component) are detected in a pattern, the color image converting part 212 converts the original material image into CMY space. In this case, the color image converting part 212 outputs an image of a color component determined as a target of pattern detection in the color image converted into CMY space (hereinafter referred to as "black-dot component"), for example, a color image of two color channels of the C component and the M component, to the pattern detection part 210.

On the other hand, if dots of a color component in RGB space (for example, the G component) are detected in a pattern, the color image converting part 212 does not perform image conversion on the original material image. In this case, the color image converting part 212 outputs, for example, an image of a G-component color channel to the pattern detecting part 210 as a black-dot component in RGB space.

In each of the former case (where the image is converted into CMY space) and the latter case (where the image remains as RGB space), which color-component (color) image is to be output to the pattern detecting part 210 may be fixed in advance or be determined by a user through the operations display part 205.

The pattern detecting part 210 detects dot patterns from an image contained in the output image data of the color image converting part 212. The information extracting part 211 extracts information embedded in the target image in accordance with the result of the detection by the pattern detecting part 210, and outputs the extracted information to the system controller 204. The system controller 204 controls the operation of the image processing apparatus 20 in accordance with the extracted information. For example, if it is determined that it is prohibited to copy a target image, making a copy of a confidential document may be prevented by destroying an image output as a result of copying. Further, the extracted information may be displayed on the operations display part 205 so as to give a user some kind of notice.

In the image processing apparatus 20, the configuration of the pattern detecting part 210 and/or the configuration of the information extracting part 211 may differ depending on the level of information extractable by the image forming apparatus 20. For example, if the image processing apparatus 20 is a "level-one detector" that supports only extraction of information up to the level one, the pattern detecting part 210 and the information extracting part 211 may be configured as follows.

Figure 15:
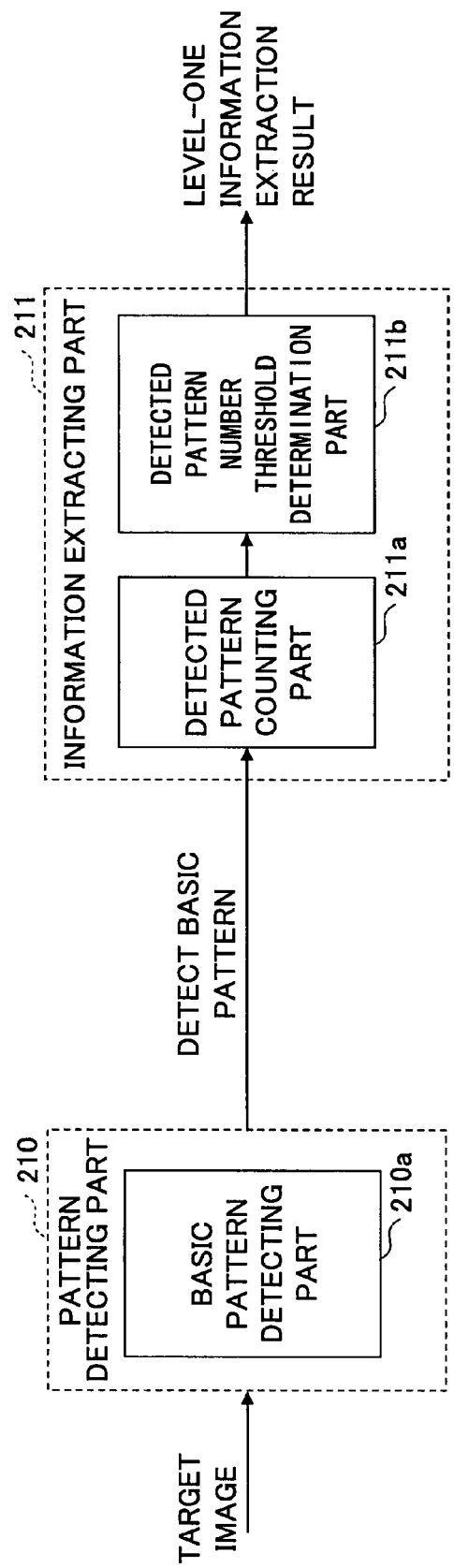
FIG. 15 is a diagram showing a configuration of a pattern detecting part and a configuration of an information extracting part in a level-one detector according to the embodiment of the present invention.

FIG. 15 is a diagram showing a configuration of the pattern detecting part 210 and a configuration of the information extracting part 211 in the level-one detector. Referring to FIG. 15, the pattern detecting part 210 includes a basic pattern detecting part 210a. Further, the information extracting part 211 includes a detected pattern counting part 211a and a detected pattern number threshold determination part 211b.

Figure 16:
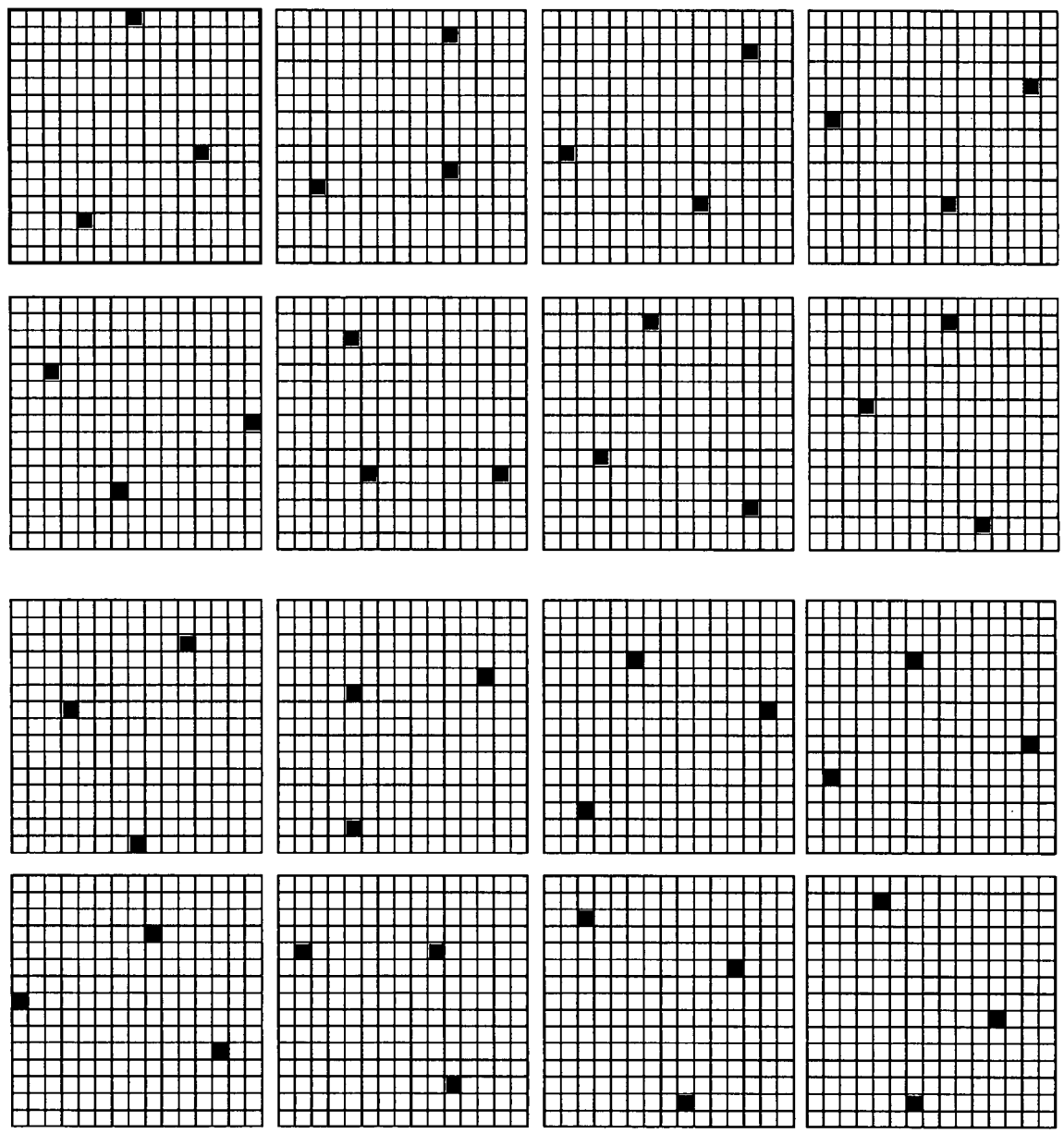
FIG. 16 is a diagram showing a pattern dictionary of patterns where a dot pattern a is rotated in increments of 22.5° according to the embodiment of the present invention.

The basic pattern detecting part 210a detects the dot patterns a and/or dot patterns equivalent to the dot patterns a rotated by any angles (basic patterns) from a target image. The basic pattern detecting part 210a detects basic patterns using, for example, a pattern dictionary as shown in FIG. 16. FIG. 16 is a diagram showing a pattern dictionary of patterns where the dot pattern a is rotated in increments of 22.5°. That is, the basic pattern detecting part 210a performs pattern matching on the target image, shifting a virtual window for the pattern matching pixel by pixel. At this point, every time the virtual window is shifted, pattern matching is repeatedly performed with the patterns contained in the pattern dictionary until any of the patterns is detected. Accordingly, if any of the patterns contained in the pattern dictionary is detected, or if none of the patterns contained in the pattern dictionary is detected, the position of the virtual window is shifted by one pixel, and the same pattern matching is repeated in the virtual window at a new position. In the course of performing such pattern matching, every time the basic pattern detecting part 210a detects any of the patterns contained in the pattern dictionary, the basic pattern detecting part 210a determines that a basic pattern is detected, and outputs a signal to that effect to the information extracting part 211.

The detected pattern counting part 211a counts the total number of basic patterns detected from the target image based on a signal output from the basic pattern detecting part 210a every time a basic pattern is detected.

The detected pattern number threshold determination part 211b compares the number of detected basic patterns counted by the detected pattern counting part 211a with a predetermined threshold, thereby determining whether the level-one information has been extracted. That is, if the number of detected basic patterns exceeds the threshold, the detected pattern number threshold determination part 211b determines that the level-one information has been extracted. In other cases, the detected pattern number threshold determination part 211b determines that the level-one information has not been extracted. It is determined that no basic pattern has been detected if the number of detected basic patterns is less than or equal to the threshold. This is so in order to eliminate the possibility of erroneously detecting a basic pattern based on a figure or design on the target image.

Further, if the image processing apparatus 20 is a "level-two detector" that supports extraction of information up to the level two, the pattern detecting part 210 and the information extracting part 211 may be configured as follows.

Figure 17:
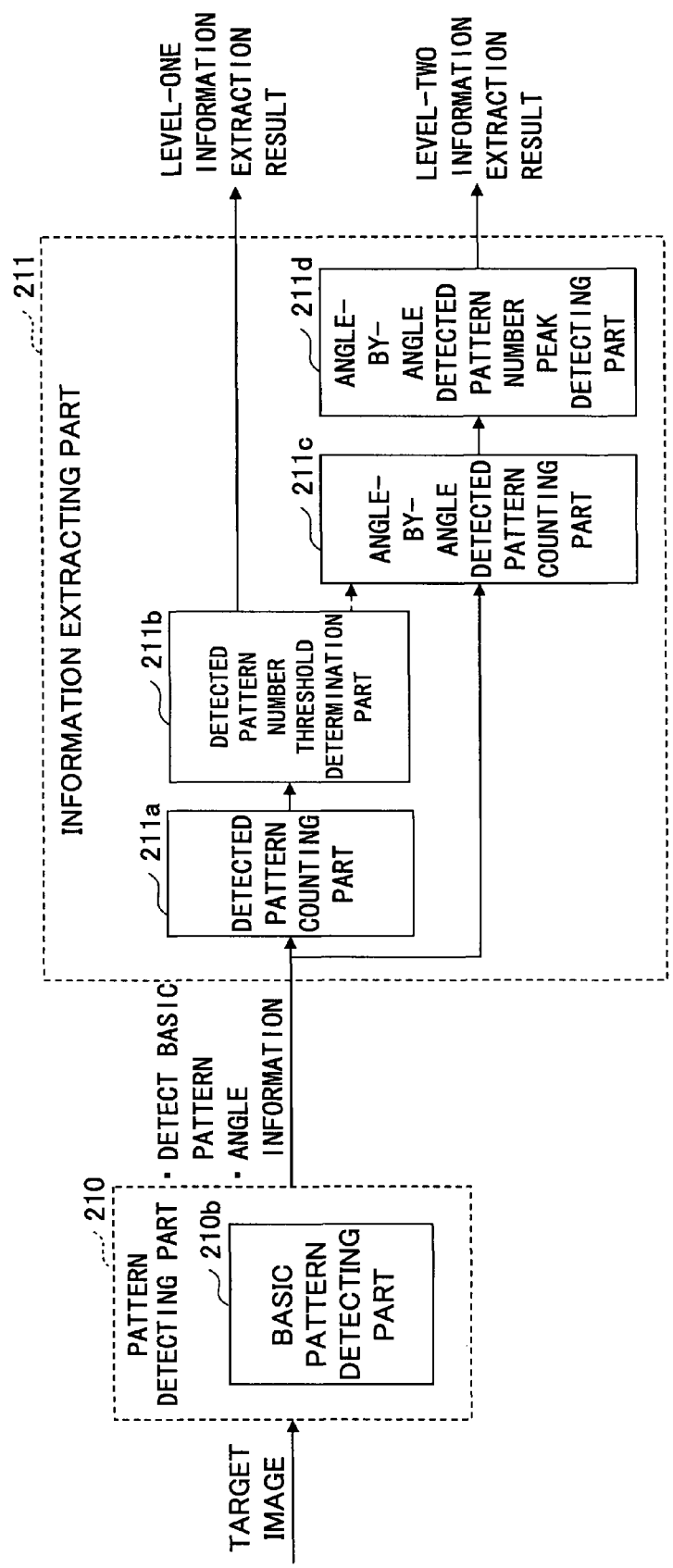
FIG. 17 is a diagram showing a configuration of the pattern detecting part and a configuration of the information extracting part in a level-two detector according to the embodiment of the present invention.

FIG. 17 is a diagram showing a configuration of the pattern detecting part 210 and a configuration of the information extracting part 211 in the level-two detector. In FIG. 17, the same elements as those of FIG. 15 are referred to by the same numerals, and a description thereof is omitted. Referring to FIG. 17, the pattern detecting part 210 includes a basic pattern detecting part 210b. Further, the information extracting part 211 includes the detected pattern counting part 211a, the detected pattern number threshold determination part 211b, an angle-by-angle detected pattern counting part 211c, and an angle-by-angle detected pattern number peak detecting part 211d.

The basic pattern detecting part 210b performs the same pattern matching as the basic pattern detecting part 210a of FIG. 15, and detects basic patterns from a target image. (Here, the basic patterns may refer to a reference pattern and patterns equivalent to the reference pattern rotated by any angles.) However, when a basic pattern is detected, the basic pattern detecting part 210b outputs not only the information that the basic pattern has been detected but also the angle information of the detected basic pattern to the information extracting part 211. As the angle information of the detected basic pattern, the angle of a pattern that matches the detected basic pattern in the pattern dictionary is directly adopted. Accordingly, the angle information is output in units of 22.5° based on the pattern dictionary of FIG. 16.

The angle-by-angle detected pattern counting part 211c counts the number of detected basic patterns for each angle based on the angle information output from the basic pattern detecting part 210b every time a basic pattern is detected. For example, it may be determined that the number of detected basic patterns for 22.5° is n and the number of detected basic patterns for 45° is m.

The angle-by-angle detected pattern number peak detecting part 211d detects two peaks with respect to the numbers of detected basic patterns for the respective angles counted by the angle-by-angle detected pattern counting part 211c, and determines the angular difference between the two peaks as the relative angle between the basic (reference) and additional patterns. That is, at the level two, the basic (reference) and additional patterns having a relative angle corresponding to the embedded information are combined with the target image, but the angle of each pattern is not always detected with accuracy at the time of its detection. For example, even when original material on which the target image is printed is scanned with accuracy (with no inclination), the dot pattern a of 45° may be detected as 42.5° in some cases and as 47.5° in other cases. Accordingly, the distribution of detected angles is determined in the angle-by-angle detected pattern number counting part 211c, and the difference in angle between two peaks in the distribution is determined as the relative angle between the basic and additional patterns in the angle-by-angle detected pattern number peak detecting part 211d, thereby increasing tolerance of wrong recognition (determination). The angle-by-angle detected pattern number peak detecting part 211d further outputs information corresponding to the detected relative angle (level-two information).

In the level-two detector, the output results of the angle-by-angle detected pattern number counting part 211c and the angle-by-angle detected pattern number peak detecting part 211d are made valid only when the level-one information is detected, that is, the detected pattern number threshold determination part 211b determines that more basic patterns than the threshold have been detected.

Further, if the image processing apparatus 20 is a "level-three detector" that supports extraction of information up to the level three, the pattern detecting part 210 and the information extracting part 211 may be configured as follows.

Figure 18:
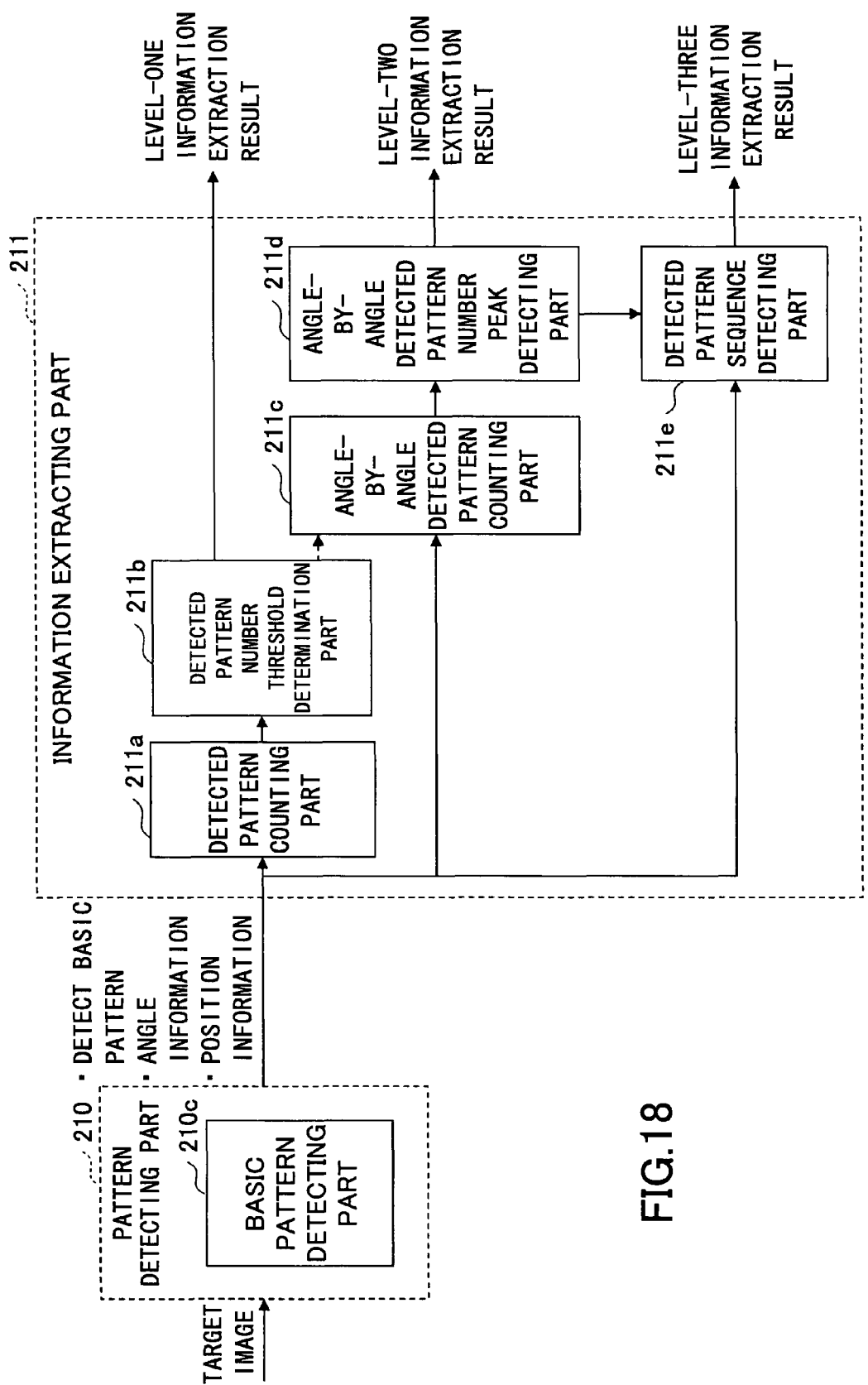
FIG. 18 is a diagram showing a configuration of the pattern detecting part and a configuration of the information extracting part in a level-three detector according to the embodiment of the present invention.

FIG. 18 is a diagram showing a configuration of the pattern detecting part 210 and a configuration of the information extracting part 211 in the level-three detector. In FIG. 18, the same elements as those of FIG. 17 are referred to by the same numerals, and a description thereof is omitted. Referring to FIG. 18, the pattern detecting part 210 includes a basic pattern detecting part 210c. Further, the information extracting part 211 includes the detected pattern counting part 211a, the detected pattern number threshold determination part 211b, the angle-by-angle detected pattern counting part 211c, the angle-by-angle detected pattern number peak detecting part 211d, and a detected pattern sequence detecting part 211e.

The basic pattern detecting part 210c performs the same pattern matching as the basic pattern detecting part 210b of FIG. 17, and detects basic patterns from a target image. However, when a basic pattern is detected, the basic pattern detecting part 210c outputs not only the angle information but also the position information of the detected basic pattern to the information extracting part 211. The coordinate values of the center pixel of the detected basic pattern on the target image may be adopted as the position information.

The detected pattern sequence detecting part 211e determines the order of placement of the basic and additional patterns based on the angles of the two peaks detected by the angle-by-angle detected pattern number peak detecting part 211d and the position information of the patterns output from the basic pattern detecting part 210c, and outputs the level-three information based on the determination result. For example, it is assumed that the angles of the two peaks are detected as 0° and 45°. (Here, a description is given, letting 0° and 45° be basic patterns and additional patterns, respectively.) In this case, the detected pattern sequence detecting part 211e determines to which of 0° and 45° the angle of the dot pattern a at each position is closer, and thereby determines whether the dot pattern a at each position is a basic pattern or an additional pattern. The detected pattern sequence detecting part 211e detects the sequence of the basic and additional patterns based on the result of the determination, and outputs the level-three information. The sequence may be repeatedly detected by determining the sequence length in advance.

Figure 19:
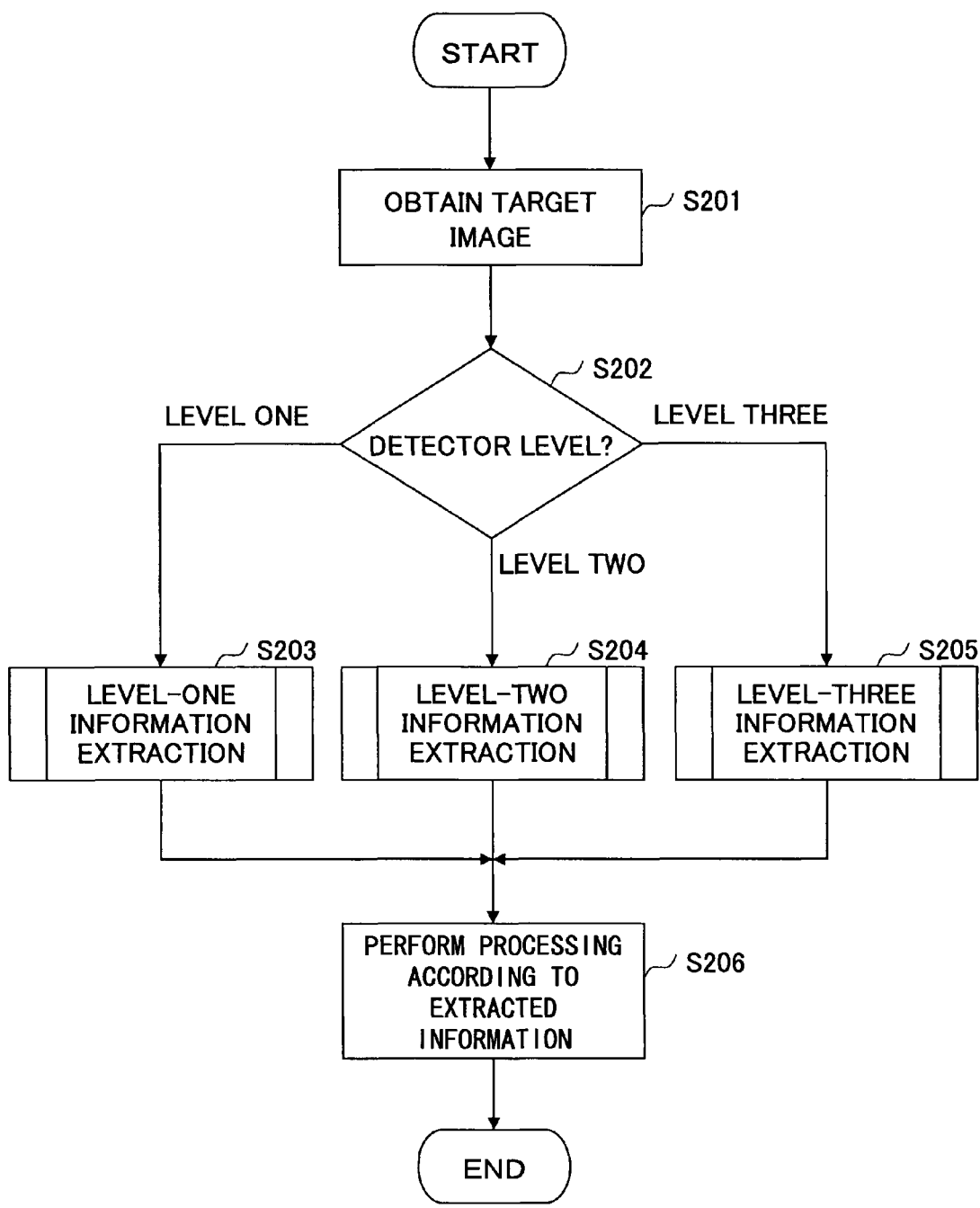
FIG. 19 is a flowchart for illustrating information extraction by the image processing apparatus of FIG. 14 according to the embodiment of the present invention.

A description is given below of an operational procedure of the image processing apparatus 20 of FIG. 14. FIG. 19 is a flowchart for illustrating information extraction by the image processing apparatus 20. FIG. 19 shows the case of extracting information from a printed document printed by the image processing apparatus 10 performing the processing of FIG. 11.

First, in step S201, the image processing apparatus 20 reads a target image from the printed document with the scanner 201. Next, in step S202, the level of the image processing apparatus 20 is determined so that the processing is to be performed in accordance with the determined level. That is, if the image processing apparatus 20 is a level-one detector ("level one" in step S202), in step S203, the level-one information (the presence or absence of copying restriction) is extracted. If the image processing apparatus 20 is a level-two detector ("level two" in step S202), in step S204, the level-one information and the level-two information (confidentiality level) are extracted. Further, if the image processing apparatus 20 is a level-three detector ("level three" in step S202), in step S205, the level-one information, the level-two information, and the level-three information (username) are extracted. The extracted information is output to the system controller 204, so that the system controller 204 performs processing according to the extracted information. For example, if copying is restricted, an image destroying signal is output in accordance with the confidentiality level. Further, the username is displayed on the operations display part 205.

Next, a detailed description is given of each of the level-one information extraction (step S203), the level-two information extraction (step S204), and the level-three information extraction (step S205) of FIG. 19.

Figure 20:
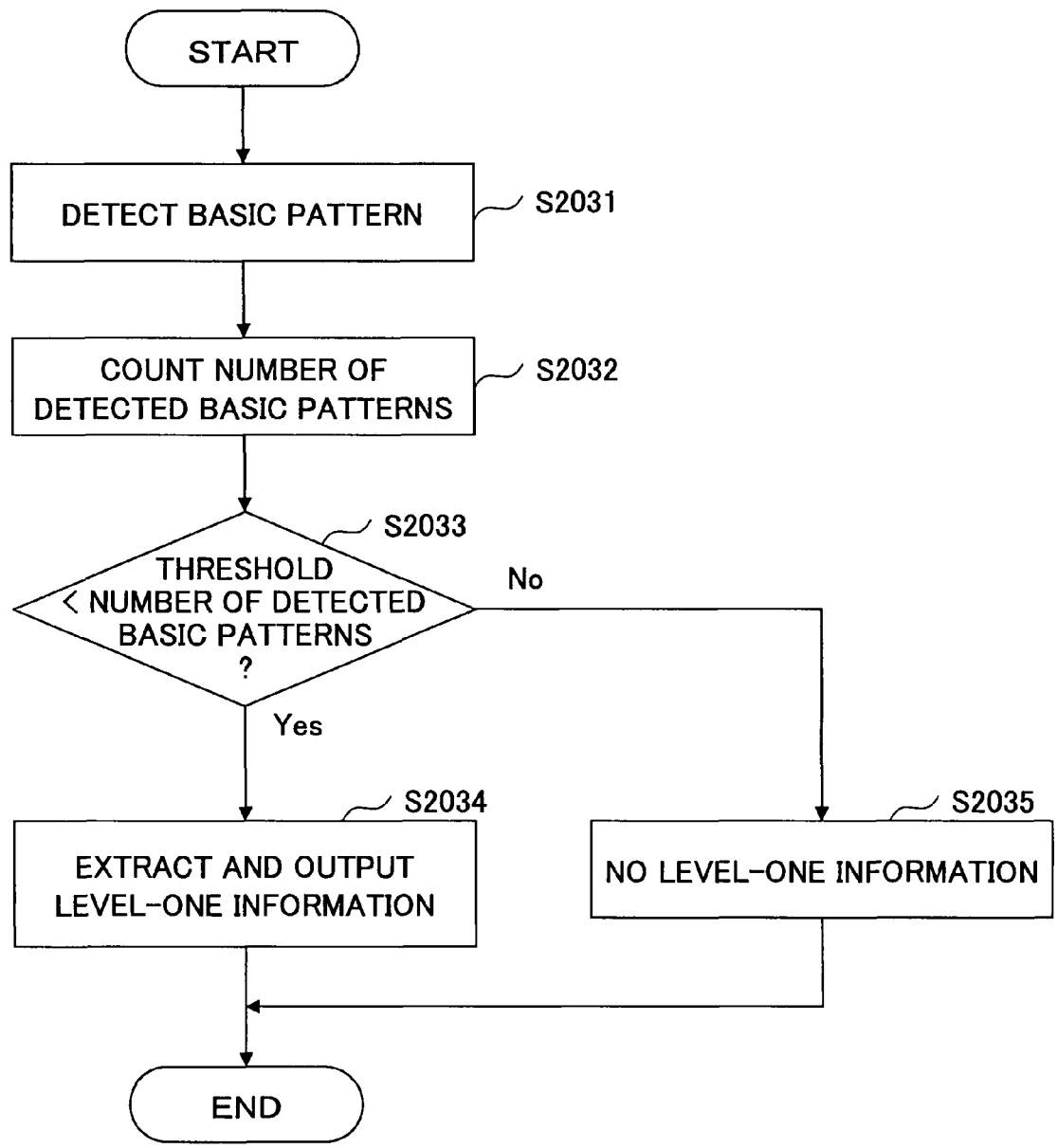
FIG. 20 is a flowchart for illustrating level-one information extraction according to the embodiment of the present invention.

FIG. 20 is a flowchart for illustrating the level-one information extraction.

The basic pattern detecting part 210a performs pattern matching using the pattern dictionary as shown in FIG. 16, thereby attempting to detect the dot patterns a and/or dot patterns equivalent to the dot patterns a rotated by any angles (basic patterns) from the target image. In step S2031, every time the basic pattern detecting part 210a detects a basic pattern, the basic pattern detecting part 210a notifies the detected pattern counting part 211a of detection of the basic pattern. In step S2032, the detected pattern counting part 211a counts the number of detected basic patterns in response to the notification from the basic pattern detecting part 210a. In step S2033, the detected pattern number threshold determination part 211b compares the number of detected basic patterns counted by the detected pattern counting part 211a with a threshold. When the number of detected basic patterns exceeds the threshold (YES in step S2033), in step S2034, the detected pattern number threshold determination part 211b determines that the level-one information is embedded, and outputs the determination result. On the other hand, if the number of detected basic patterns does not exceed the threshold when pattern matching is completed on the entire surface of the target image (NO in step S2033), in step S2035, the detected pattern number threshold determination part 211b determines that the level-one information is not embedded, and outputs the determination result.

Figure 21:
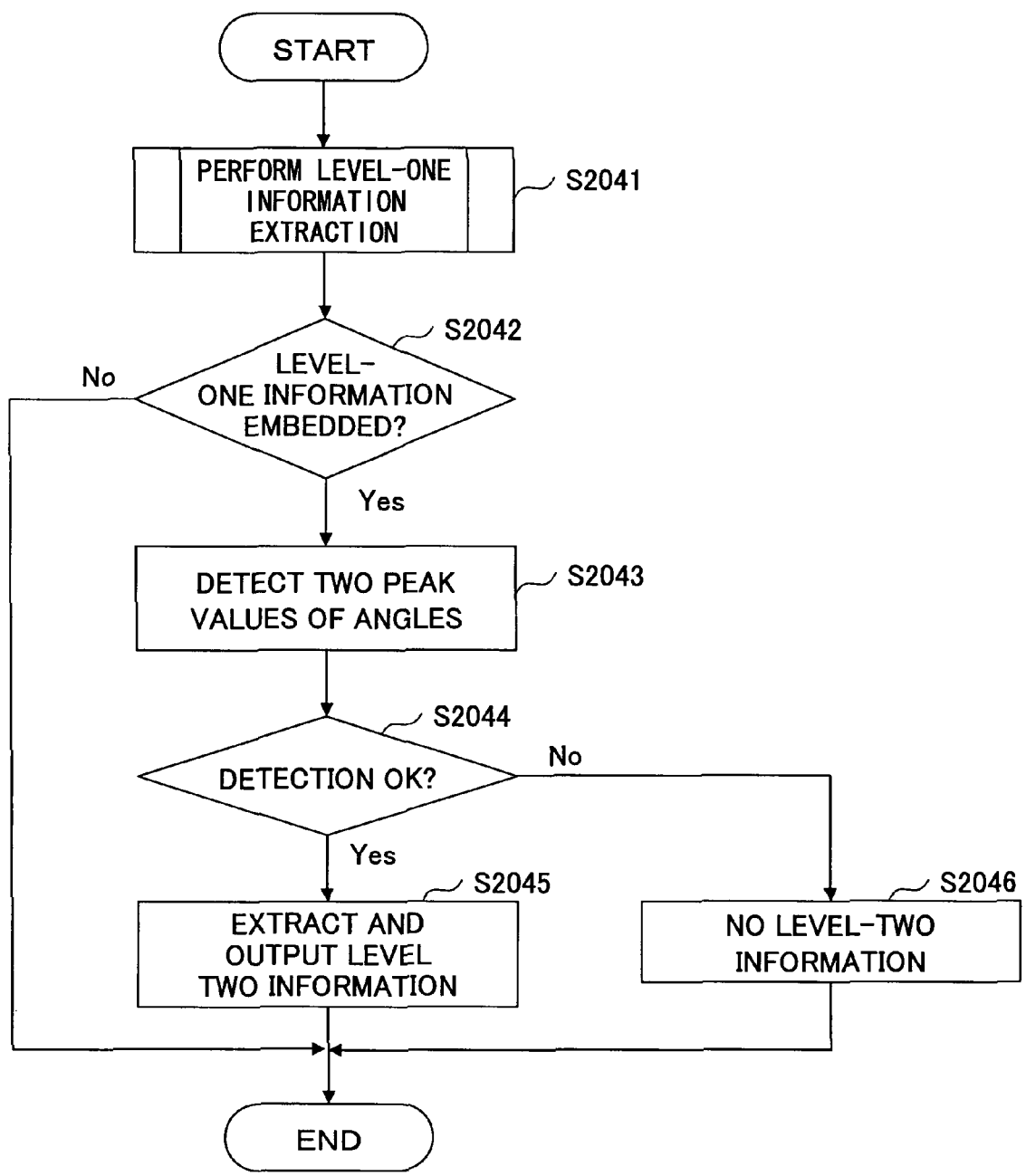
FIG. 21 is a flowchart for illustrating level-two information extraction according to the embodiment of the present invention.

FIG. 21 is a flowchart for illustrating the level-two information extraction.

First, in step S2041, the level-one information extraction described with reference to FIG. 20 is performed. Then, in step S2042, it is determined whether the level-one information is embedded. If it is determined that the level-one information is embedded (YES in step S2042), in step S2043, the angle-by-angle detected pattern number peak detecting part 211d attempts to detect two peaks with respect to the numbers of detected basic patterns for respective angles counted by the angle-by-angle detected pattern counting part 211c. In step S2044, it is determined whether two peaks have been detected. If two peaks have been detected (YES in step S2044), in step S2045, the angle-by-angle detected pattern number peak detecting part 211d extracts the level-two information (confidentiality level) based on the angular difference between the two peaks, and outputs the extracted information. The confidentiality level may be extracted based on the angle by referring to the correspondence table of FIG. 12 in the reverse way. On the other hand, if it is determined that two peaks have not been detected (NO in step S2044), in step S2046, the angle-by-angle detected pattern number peak detecting part 211d determines that the level-two information is not embedded, and outputs the detection result. If the level-one information is not embedded in the first place (NO in step S2042), the level-two information is not embedded. Accordingly, the processing ends without extracting the level-two information.

FIG. 22 is a flowchart for illustrating the level-three information extraction.

First, in step S2051, the level-two information extraction described with reference to FIG. 21 is performed. Then, in step S2052, it is determined whether the level-two information is embedded. If it is determined that the level-two information is embedded (YES in step S2052), in step S2053, based on the position information of the detected basic and additional patterns, the detected pattern sequence detecting part 211e attempts to detect a sequence formed by these two types of patterns. Then, in step S2054, it is determined whether a sequence formed by these two types of patterns has been detected. If it is determined that a sequence formed by these two types of patterns has been detected (YES in step S2054), in step S2055, the detected pattern sequence detecting part 211e extracts the level-three information (username) based on the detected sequence, and outputs the extracted information. The username may be extracted based on the sequence by referring to the correspondence table of FIG. 13 in the reverse way. On the other hand, if no sequence has been detected (NO in step S2054), in step S2056, the detected pattern sequence detecting part 211e determines that the level-three information is not embedded, and outputs the determination result. If the level-two information is not embedded in the first place (NO in step S2052), the level-three information is not embedded. Accordingly, the processing ends without extracting the level-three information.

As described above, according to the image processing apparatus 10 or the image processing apparatus 20 of this embodiment, it is possible to hierarchically embed one-bit information through multi-bit information in an image. In this case, downward compatibility is maintained between each adjacent two layers. Accordingly, it is possible to further increase the amount of embeddable information to several to approximately 100 bits while maintaining compatibility with an image processing apparatus that prohibits copying by detecting one-bit information embedded in a medium such as paper in real time and with such a medium as paper in which one-bit information is embedded. Accordingly, it is possible to provide various security functions. For example, with several-bit information, it is possible to perform flexible copying prohibition control such as determining whether to authorize or prohibit copying based on the title (position) of a user by combining the image processing apparatus and user authentication. Further, with approximately 100-bit information, it is possible to realize a tracing function off-line while enjoying the copying prohibition control function with the existing one-bit and several-bit information.

According to one embodiment of the present invention, information may be embedded in not only common printing paper but also a photograph and a ticket.

Thus, according to embodiments of the present invention, it is possible to provide an image processing apparatus, an image processing method, a computer data signal, and a computer program product capable of appropriately increasing the amount of information embeddable in an image or the amount of information extractable from an image.

The present invention is not limited to the specifically disclosed embodiment, and variations and modifications may be made without departing from the scope of the present invention.

The present application is based on Japanese Priority Patent Applications No. 2006-177172, filed on Jun. 27, 2006, and No. 2007-152024, filed on Jun. 7, 2007, the entire contents of which are hereby incorporated by reference.

What is claimed is:

1. An image processing apparatus embedding information in an image by combining a plurality of predetermined patterns with the image, the image processing apparatus comprising:

a level determination part configured to determine at least one of levels of conditions to be added regarding a disposition of the predetermined patterns, to which at least one of the levels the information to be embedded belongs; and a pattern combining part configured to combine the predetermined patterns with the image in accordance with the condition corresponding to the information to be embedded at the determined at least one of the levels, wherein if the information to be embedded belongs to two or more of the levels, the pattern combining part combines the predetermined patterns so that the conditions corresponding to the information to be embedded are satisfied at the two or more of the levels.

2. The image processing apparatus as claimed in claim 1, wherein the condition of an upper one of the levels has a further restriction added thereto compared with the condition of a lower one of the levels.

3. The image processing apparatus as claimed in claim 1, wherein the condition of an upper one of the levels is capable of increasing an amount of the information to be embedded compared with the condition of a lower one of the levels.

4. The image processing apparatus as claimed in claim 1, wherein detection of the predetermined patterns combined with the image is easier with the condition of a lower one of the levels than with the condition of an upper one of the levels.

5. The image processing apparatus as claimed in claim 4, wherein the condition added regarding the disposition of the predetermined patterns at the upper one of the levels is, in addition to the condition at the lower one of the levels, that positions of the predetermined patterns relative to each other be determined in accordance with the information to be embedded.

6. The image processing apparatus as claimed in claim 1, wherein the condition added regarding the disposition of the predetermined patterns at a first one of the levels is that the predetermined patterns or patterns equivalent to the rotated predetermined patterns be present on the image.

7. The image processing apparatus as claimed in claim 6, wherein the condition added regarding the disposition of the predetermined patterns at a second one of the levels is, in addition to the condition at the first one of the levels, that a relative angle between the predetermined patterns be determined in accordance with the information to be embedded.

8. The image processing apparatus as claimed in claim 7, wherein the condition added regarding the disposition of the predetermined patterns at a third one of the levels is, in addition to the condition at the second one of the levels, that positions of the predetermined patterns relative to each other be determined in accordance with the information to be embedded.

9. An image processing method embedding information in an image by combining a plurality of predetermined patterns with the image, comprising the steps of:

determining at least one of levels of conditions to be added regarding a disposition of the predetermined patterns, to which at least one of the levels the information to be embedded belongs; and combining the predetermined patterns with the image in accordance with the condition corresponding to the information to be embedded at the determined at least one of the levels, wherein if the information to be embedded belongs to two or more of the levels, the step of combining combines the predetermined patterns so that the conditions corresponding to the information to be embedded are satisfied at the two or more of the levels.

10. The image processing method as claimed in claim 9, wherein the condition of an upper one of the levels has a further restriction added thereto compared with the condition of a lower one of the levels.

11. The image processing method as claimed in claim 9, wherein the condition of an upper one of the levels is capable of increasing an amount of the information to be embedded compared with the condition of a lower one of the levels.

12. The image processing method as claimed in claim 9, wherein detection of the predetermined patterns combined with the image is easier with the condition of a lower one of the levels than with the condition of an upper one of the levels.

13. The image processing method as claimed in claim 9, wherein the condition added regarding the disposition of the predetermined patterns at a first one of the levels is that the predetermined patterns or patterns equivalent to the rotated predetermined patterns be present on the image.

14. The image processing method as claimed in claim 13, wherein the condition added regarding the disposition of the predetermined patterns at a second one of the levels is, in addition to the condition at the first one of the levels, that a relative angle between the predetermined patterns be determined in accordance with the information to be embedded.

15. The image processing method as claimed in claim 14, wherein the condition added regarding the disposition of the predetermined patterns at a third one of the levels is, in addition to the condition at the second one of the levels, that positions of the predetermined patterns relative to each other be determined in accordance with the information to be embedded.

16. A non-transitory computer readable medium comprising: computer readable program code embodied in said medium for causing a computer to execute the image processing method as set forth in claim 9.

17. The medium as claimed in claim 16, wherein: the condition added regarding the disposition of the predetermined patterns at a first one of the levels is that the predetermined patterns or patterns equivalent to the rotated predetermined patterns be present on the image; the condition added regarding the disposition of the predetermined patterns at a second one of the levels is, in addition to the condition at the first one of the levels, that a relative angle between the predetermined patterns be determined in accordance with the information to be embedded; and the condition added regarding the disposition of the predetermined patterns at a third one of the levels is, in addition to the condition at the second one of the levels, that positions of the predetermined patterns relative to each other be determined in accordance with the information to be embedded.

* * * * *